(12) United States Patent  (10) Patent No.: US 7,975,233 B2
Macklem et al.  (45) Date of Patent: Jul. 5, 2011

(54) AUTOMATIC CONVERSION OF A TEXTUAL LANGUAGE INTO A GRAPHICAL PROGRAM REPRESENTATION

(75) Inventors: Grant V. Macklem, Austin, TX (US); Lothar Wenzel, Round Rock, TX (US); Rishi H. Gosalia, Austin, TX (US); James T. Juhasz, Austin, TX (US); Ricardo Dunia, Austin, TX (US)

(73) Assignee: National Instruments Corporation, Austin, TX (US)

( * ) Notice: Subject to any disclaimer, the term of this patent is extended or adjusted under 35 U.S.C. 154(b) by 987 days.

(21) Appl. No.: 11/539,424

(22) Filed: Oct. 6, 2006

(65) Prior Publication Data

US 2008/0022259 A1  Jan. 24, 2008

Related U.S. Application Data

(60) Provisional application No. 60/820,127, filed on Jul. 24, 2006.

(51) Int. Cl.
 *G06F 3/048* (2006.01)
(52) U.S. Cl. ........ 715/763; 715/234; 715/760; 715/762; 717/104; 717/105; 717/106; 717/109; 717/110; 717/113
(58) Field of Classification Search .................. 715/760, 715/763
See application file for complete search history.

(56) References Cited

U.S. PATENT DOCUMENTS

| | | | |
|---|---|---|---|
| 4,796,179 A | 1/1989 | Lehman et al. | |
| 4,831,580 A | 5/1989 | Yamada | |
| 4,901,221 A | 2/1990 | Kodosky et al. | |
| 4,914,568 A | 4/1990 | Kodosky et al. | |
| 5,089,973 A | 2/1992 | Furtek | |
| 5,210,837 A | 5/1993 | Wiecek | |
| 5,237,691 A | 8/1993 | Robinson | |
| 5,301,301 A | 4/1994 | Kodosky et al. | |
| 5,481,712 A | 1/1996 | Silver et al. | |
| 5,481,741 A | 1/1996 | McKaskle et al. | |
| 5,576,946 A | 11/1996 | Bender et al. | |
| 5,612,866 A | 3/1997 | Savanyo et al. | |
| 5,680,622 A * | 10/1997 | Even | 717/154 |
| 5,732,277 A | 3/1998 | Kodosky et al. | |
| 5,742,504 A | 4/1998 | Meyer et al. | |
| 5,862,372 A | 1/1999 | Morris et al. | |
| 5,911,070 A | 6/1999 | Solton et al. | |

(Continued)

FOREIGN PATENT DOCUMENTS

EP  1077404 C1  2/2001

OTHER PUBLICATIONS

Varanese, "Game Scripting Mastery", 2003, Premier Press.*

(Continued)

*Primary Examiner* — Alvin H Tan
(74) *Attorney, Agent, or Firm* — Meyertons Hood Kivliv Kowert & Goetzel, P.C.; Jeffrey C. Hood

(57) ABSTRACT

Automatic conversion of textual program code to graphical program code is performed. The method automatically translates the given functionality of a textual program code into executable graphical program code, corresponding to the same functionality. The method includes a parsing routine that generates a syntax tree and code generation routines, which create graphical program code from the syntax tree.

33 Claims, 23 Drawing Sheets

U.S. PATENT DOCUMENTS

| | | | |
|---|---|---|---|
| 5,940,296 | A | 8/1999 | Meyer |
| 5,966,532 | A | 10/1999 | McDonald et al. |
| 6,053,951 | A | 4/2000 | McDonald et al. |
| 6,064,409 | A | 5/2000 | Thomsen et al. |
| 6,173,438 | B1 | 1/2001 | Kodosky et al. |
| 6,219,628 | B1 | 4/2001 | Kodosky et al. |
| 6,366,300 | B1 | 4/2002 | Ohara |
| 6,437,805 | B1 | 8/2002 | Sojoodi et al. |
| 6,453,464 | B1 | 9/2002 | Sullivan et al. |
| 6,715,139 | B1 | 3/2004 | Kodosky et al. |
| 6,857,118 | B2 | 2/2005 | Karr et al. |
| 6,865,429 | B1 | 3/2005 | Schneider et al. |
| 6,880,130 | B2 | 4/2005 | Makowski et al. |
| 6,961,868 | B2 | 11/2005 | Tormasov et al. |
| 7,000,190 | B2 | 2/2006 | Kudukoli et al. |
| 7,000,213 | B2 | 2/2006 | Banerjee et al. |
| 7,024,631 | B1 | 4/2006 | Hudson et al. |
| 7,024,660 | B2 | 4/2006 | Andrade et al. |
| 7,043,693 | B2 | 5/2006 | Wenzel et al. |
| 7,062,718 | B2 | 6/2006 | Kodosky |
| 7,076,740 | B2 | 7/2006 | Santori et al. |
| 7,093,005 | B2 * | 8/2006 | Patterson ............ 709/220 |
| 7,120,876 | B2 | 10/2006 | Washington et al. |
| 7,159,183 | B1 | 1/2007 | Kudukoli et al. |
| 7,200,838 | B2 | 4/2007 | Kodosky et al. |
| 7,210,117 | B2 | 4/2007 | Kudukoli et al. |
| 7,302,675 | B2 | 11/2007 | Rogers et al. |
| 7,509,244 | B1 | 3/2009 | Shakeri et al. |
| 7,509,619 | B1 | 3/2009 | Miller et al. |
| 7,533,362 | B1 | 5/2009 | Britchard |
| 7,627,860 | B2 | 12/2009 | Kodosky et al. |
| 7,743,362 | B2 * | 6/2010 | Peck et al. ............ 717/109 |
| 2001/0020291 | A1 | 9/2001 | Kudukoli et al. |
| 2002/0129333 | A1 | 9/2002 | Chandhoke et al. |
| 2003/0046663 | A1 | 3/2003 | Rogers et al. |
| 2003/0071842 | A1 | 4/2003 | King et al. |
| 2003/0071845 | A1 | 4/2003 | King et al. |
| 2004/0010734 | A1 | 1/2004 | Ghercioiu et al. |
| 2004/0034696 | A1 | 2/2004 | Joffrain et al. |
| 2004/0034847 | A1 | 2/2004 | Joffrain et al. |
| 2004/0158812 | A1 | 8/2004 | Dye et al. |
| 2004/0199897 | A1 | 10/2004 | Ghercioiu et al. |
| 2004/0210592 | A1 | 10/2004 | Ciolfi |
| 2004/0230946 | A1 | 11/2004 | Makowski et al. |
| 2005/0028138 | A1 | 2/2005 | Case et al. |
| 2005/0091602 | A1 | 4/2005 | Ramamoorthy et al. |
| 2005/0177816 | A1 | 8/2005 | Kudukoli et al. |
| 2005/0229154 | A1 * | 10/2005 | Hiew et al. ............ 717/110 |
| 2005/0235290 | A1 | 10/2005 | Jefferson et al. |
| 2005/0251789 | A1 | 11/2005 | Peck et al. |
| 2005/0257194 | A1 | 11/2005 | Morrow et al. |
| 2005/0257195 | A1 | 11/2005 | Morrow et al. |
| 2006/0225034 | A1 | 10/2006 | Peck et al. |
| 2007/0044030 | A1 | 2/2007 | Hayles |
| 2007/0044071 | A1 | 2/2007 | Hayles |
| 2008/0022259 | A1 | 1/2008 | Macklem et al. |
| 2008/0022264 | A1 | 1/2008 | Macklem et al. |
| 2009/0049424 | A1 | 2/2009 | Kumar et al. |

OTHER PUBLICATIONS

Lee, Edward A., Stephen Neuendorffer, "Actor-Oriented Design of Embedded Hardware and Software Systems", Journal of Circuits, Systems, and Computers, vol. 12, No. 3, World Scientific Publishing Company, 2003, 30 pages.

Lee, Edward A., "Embedded Software", Advances in Computers, vol. 56, Academic Press, London, 2002, 34 pages.

Lee, Edward A. Stephen Neuendorffer, "Concurrent Models of Computation for Embedded Software", IEE Proc.-Comput. Digit. Tech., vol. 152, No. 2, Mar. 2005, 12 pages.

U.S. Appl. No. 11/759,991, titled "Diagram with Configurable Wires", filed Jun. 8, 2007, whose inventors are Jeffrey L. Kodosky, Jeffrey N. Correll, David W. Fuller III, Timothy J. Hayles, John R. Breyer, and Jacob Kornerup, 105 pages, Pub. No. US 2008/0034079.

Lee, Edward A. et al, "Ptolemy II, Hererogeneous Concurrent Modeling and Design in Java", Jul. 29, 2004, http://ptolemy.eecs.berkeley.edu/papers/04/ptIIDesignIntro/ptIIdesign1-intro.pdf, 282 pages.

Edwards, "The Specification and Execution of Heterogeneous Synchronous Reactive Systems", Doctoral Dissertation, University of California, Berkeley, 1997, 170 pages.

Pino, et al., "Cosimulating Synchronous DSP Designs with Analog RF Circuits," Hewlett Packard, 1999, 15 pages.

Altium Limited, "Altium Nexar release heads 'LiveDesign-enabled' 2004 product line-up", Press Release, Feb. 17, 2004, 3 pages.

Axys Design Automation, Inc., "Product Description for MaxCore", 2002, 2 pages.

Axys Design Automation, Inc., "Product Description for MaxSim", 2002, 2 pages.

International search report and written opinion, application No. PCT/US2005/016630, mailed Feb. 21, 2006.

Chang, et al., "Heterogeneous Simulation—Mixing Discrete-Event Models with Dataflow", Journal of VLSI Signal Processing, The Netherlands, 1997, pp. 127-144.

Buck, et al., "Ptolemy: A Framework for Simulating and Prototyping Heterogeneous Systems", International Journal in Computer Simulation, vol. 4, No. 2, 1994, pp. 155-182.

Besnard, et al, "Design of a multi-formalism application and distribution in a data-flow context: an example", 12th International Symposium on Languages for International Programming, Athens, Greece, Jun. 1999, pp. 8-30.

Andrade, et al., "Software Synthesis from Dataflow Models for G and LabVIEW", IEEE Asilomar Conference on Signals, Systems, and Computers, Pacific Grove, California, Nov. 1998, pp. 1705-1709.

National Instruments, "The Measurement and Automation Catalog 2004", National Instruments, 2004, 3 pages.

The Mathworks, "STATEFLOW for State Diagram Modeling User's Guide", Version 4, 1997, 6 pages.

The Mathworks, "SIMULINK Model-Based and System-Based Design", Version 5, Jul. 2002, 578 pages.

Simulink, "Simulink Release Notes", Jun. 2, 2004, 78 pages.

Chandrachoodan, et al., "An Efficient Timing Model for Hardware Implementation of Multirate Dataflow Graphs", IEEE, 2001, pp. 1153-1156.

"Optilab: Image Processing and Analysis Software for the Apple Macintosh II User's Manual", GTFS Inc., 1990, 238 pages.

Rizzo, "Image Analyst and Enhance", MacUser, Jul. 1990, pp. 55-58.

Rosenthal, et al., "Integrated Approach to Machine Vision Application Development", SPIE vol. 1386, Nov. 8, 1990, pp. 158-162.

Villiger, et al., "Self-timed Ring for Globally-Asynchronous Locally-Synchronous Systems", Proceedings of the 9th International Symposium on Asynchronous Circuits and Systems, 2003, IEEE, pp. 1-10.

Automatix,"Vision for Process Feedback and Control", News Release, www.applefritter.com/macclones/automatix/newsrelease, Jul. 3, 2000, 4 pages.

"GUI Definition", www.whatis.com, http://searchvb.techtarget.com/sDefinition/0,290660,sid8_gci213989,00.html, retrieved May 14, 2007, 1 page.

Mort, et al., "Low Cost Image Analysis Workstation Which is Menu Driven and Extensible", SPIE, vol. 1232, Feb. 4, 1990, pp. 380-389.

Signal Analytics, "IPLab User's Guide", 1991, 268 pages.

Gitlow, "X-Ray Vision", MacGuide Magazine, vol. 2, Issue 4, Jun. 1989, pp. 89-94.

Ford,, "Optimage Processes Scientific Images", 1994, 1 page.

Signal Analytics Corp., "Signal Analytics Brings Powerful Scientific Image Processing to the Macintosh II", News Release, Feb. 1, 1990, 2 pages.

Signal Analytics Corp., "IPLab: Serious Scientific Image Processing for the Macintosh II", 1992, 4 pages.

Signal Analytics Corp., "IPLab Gives You Unparalleled Value", 1992, 6 pages.

Signal Analytics Corp., "IPLab Brings Affordable Scientific Image Processing to the Macintosh II", estimated 1990, 2 pages.

Automatix, Inc., "A Seminar on Machine Vision & Image Analysis", 1993, 46 pages.

National Instruments, "Measurement and Automation Catalogue 1999", pp. 518-520.

"Ultimage and IPLab Spectrum", MacUser, Jul. 1991, 5 pages.

Magnusson, "State diagram generation", Term paper in the graduate course Attribute Grammars, Lund University, Spring 1999, 21 pages.

Vasilache, et al., "Translating OMT State Diagrams with Concurrency into SDL Diagrams", University of Tsukuba, Japan, Aug. 28-31, 2000, 7 pages.

"Graphical User Interface (GUI)", The Motive Web Design Glossary, www.motive.co.nz/glossary/gui.php, retrieved May 14, 2007, 2 pages.

National Instruments, "IMAQ Vision Builder Tutorial", Jan. 1999, 73 pages.

"Special Report: Imaging and the Macintosh/Robust Image Databases" Advanced Imaging, Apr. 1991, pp. 18-32.

Bhattacharyya, et al., "Synthesis of Embedded Software from Synchronous Dataflow Specifications", Journal of VLSI Signal Processing, vol. 21, 1999, pp. 151-166.

Hunt, "IDF: A graphical dataflow programming language for image processing and computer vision", IEEE, 1990, retrieved from the IEEE database Jan. 7, 2003, pp. 351-360.

Keddy, et al., "DEDIP: A User-friendly environment for digital image processing algorithm development", IEEE, 1991, retrieved from the IEEE database on Jan. 1, 2003, pp. 733-736.

Konstantinides, et al., "The Khoros Software Development Environment for Image and Signal Processing", 1992, retrieved from http://www.hpl.hp.com/techreports/92/HPL-92-96.pdf on Jan. 7, 2003, pp. 1-14.

Sim, et al., "Design and Implementation of the Visual Programming Environment for the Distributed Image Processing", IEEE, 1996, retrieved from IEEE database on Jan. 7, 2003, pp. 149-152.

"SILMA Products—Production PILOT", retrieved from Internet on May 24, 2001, www.adept.com/Silma/products/pd-productionpilot.html, 4 pages.

"RoboWorks", Newtonium, retrieved from Internet on Mar. 30, 2002, www.newtonium.com/public_html/Products/RoboWorks/RoboWorks.htm, 3 pages.

National Instruments, "The Measurement and Automation Catalog 2002", 19 pages.

Compumotor, "Motion Architect User Guide", Aug. 1994, 24 pages.

GE Fanuc, "GE Fanuc Automation—Software Solutions", 2002, 8 pages.

GE Industrial Systems, "Cimplicity Machine Edition—Motion Developer", Dec. 6, 2001, 4 pages.

GE Fanuc, "GE Fanuc Automation—Cimplicity Machine Edition", 2000, 4 pages.

"Motion Builder: Making Motion Control Programming Easy"; Servo Catalogue, Parker Automation, 1996, pp. 86-87.

Russell, et al, "PL/SQL User's Guide and Reference Release 2(9.2)"; Mar. 2002, Oracle, pp. xxi-xxx, 1-1 to 1-24, 2-1 to 2-36, 9-1 to 9-18, 10-1 to 10-40, 13-1 to 13-7, 13-39 to 13-42, 13-92 to 13-98, 13-122 to 13-130, 13-145 to 13-149, 13-182 to 13-183; Available <http://lbdwww.epfl.ch/f/teaching/courses/oracle9i/appdev.920/a96624.pdf>.

"Motion Builder Start-Up Guide and Tutorial"; Compumotor Division—Parker Hannifin Corporation; Oct. 1996, 97 pages.

* cited by examiner

Computer System
82

AUTOMATIC CONVERSION OF A TEXTUAL LANGUAGE INTO A GRAPHICAL PROGRAM REPRESENTATION

PRIORITY CLAIM

This application claims benefit of priority of provisional application Ser. No. 60/820,127 titled "Automatic Conversion of a Textual Language into a Graphical Program Representation" and filed on Jul. 24, 2006, whose inventors are Grant Macklem, Lothar Wenzel, James Juhasz, and Rishi Gosalia, which is hereby incorporated by reference as though fully and completely set forth herein.

FIELD OF THE INVENTION

The present invention relates to the field of graphical programming, and more particularly to a system and method of automatically converting a textual program into graphical source code representing the functionality of the textual program.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments, or textual languages, while the code written in these languages is referred to herein as text-based code, textual programs, textual program code, or textual code.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps, or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al. disclose a graphical programming environment that enables a user to easily and intuitively create a graphical program. Graphical programming environments such as that disclosed in Kodosky et al. can be considered a higher and more intuitive way in which to interact with a computer. A graphically based programming environment can be represented at a level above text-based high level programming languages such as C, Basic, Java, etc.

A user may assemble a graphical program by selecting various icons or nodes that represent desired functionality and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram, or graphical program, using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons that represent devices being controlled.

Thus, graphical programming has become a powerful tool available to programmers. Graphical programming environments such as the National Instruments LabVIEW® product have become very popular. Tools such as LabVIEW® have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Graphical programming environments have matured and grown in popularity and complexity. However, there exists a large amount of legacy text-based code. In addition, many users still program with textual programming environments. It would be highly desirable to provide a mechanism to convert software coded in textual programming languages into a graphical program representation. This would allow the easy use of existing textual programs in a native graphical program format. This would also allow users familiar with graphical programming techniques to view a graphical program representation of textual code, thus providing the user with a greater understanding of the code's operation. Further, a graphical program representation may have more intuitive debugging capabilities than a text based language.

One general aspect of code conversion involves abstracting the code functionality in a form that is not dependent on any particular programming environment or language. One method that has been developed for this purpose is a code parser. Code parsers are known to further comprise a lexer and a parser. The lexer is responsible for identifying individual tokens (operators, variables, constants, functions, etc.) and optionally removing comments and whitespace in the textual code. Lexers are thus known to generate a stream of tokens as output, which is then provided to the parser. The parser then generates an abstract syntax tree of nodes that represent the core functionality of the original textual code. One example of a parser is the ANTLR public domain parser, which is a table-based, top-down LL(k) parser that uses k tokens of look-ahead from left to right.

SUMMARY OF THE INVENTION

Various embodiments of the present invention provide for automatic conversion of textual programming code into graphical code.

In one embodiment of the present invention, a method for creating and executing a program comprises receiving user input specifying textual program code. The textual program code may be entered by the user or retrieved from memory. In response to the textual program code, e.g., in response to user input to execute the textual program code, the method automatically creates a graphical program (or block diagram). The graphical program comprises a plurality of interconnected nodes that visually indicates functionality of the graphical program. For example, the graphical program may be a graphical data flow program. The step of automatically creating the graphical program comprises creating the graphical program without user input specifying the nodes or connections between the nodes. The functionality of the created graphical program corresponds to the functionality specified in the textual program code. The graphical program may then be compiled into machine code for execution on a computer system.

An embodiment of the invention may further comprise receiving user input modifying the textual program code, and in response automatically modifying the graphical program to correspond to the user input modifying the textual program code.

In one embodiment, the textual program code is first converted to a syntax tree prior to conversion into a graphical program. Thus, in one exemplary embodiment, in the automatic creation of the graphical program, the method may first create a syntax tree from the textual code. The method may then use the syntax tree corresponding to the textual code to generate a plurality of operations, wherein the plurality of operations defines a plurality of steps for building a graphical block diagram. The graphical program is thus automatically generated from the syntax tree. The graphical block diagram includes executable graphical program code and corresponds in functionality to the functionality described by the syntax tree.

Implementations of the invention may also include executing the graphical program. The graphical program may be compiled and then executed, or may be interpreted. In one embodiment, the graphical program may be hidden from the user. In other words, when the user provides input to run the textual program, the conversion of the textual program to a graphical program may be hidden from the user. For example, the conversion of the textual program to a graphical program and compilation of the graphical program to executable machine code may be invisible to the user. In various cases, the graphical program code generated by the conversion may be a fully working program, or alternatively may not be a complete program. In still other cases, the present methods automatically generate only a graphical code portion, e.g., one that aids the user in program development.

In various embodiments, various portions of the graphical program may be targeted to respective different targets, including, for example, computers, programmable hardware elements, such as FPGAs, PDAs, embedded systems, such as smart sensors, etc., and/or any other type of target capable of executing graphical program code.

The conversion of a program written in a textual language into a graphical program may provide a number of benefits. For example, a graphical program representation may provide a much better visual representation of the operation of the program. In addition, once the textual program has been converted into a graphical program, various graphical program debugging features may be available, such as block execution highlighting that illustrates data flow in the program, which are not available in a text based language. Further, the graphical program may inherently support parallelism in execution, e.g., parallel execution on multiple processor cores, which is generally unavailable in a sequential text based program.

BRIEF DESCRIPTION OF THE DRAWINGS

A better understanding of the present invention can be obtained when the following detailed description of the preferred embodiment is considered in conjunction with the following drawings, in which.

Figure 1A:
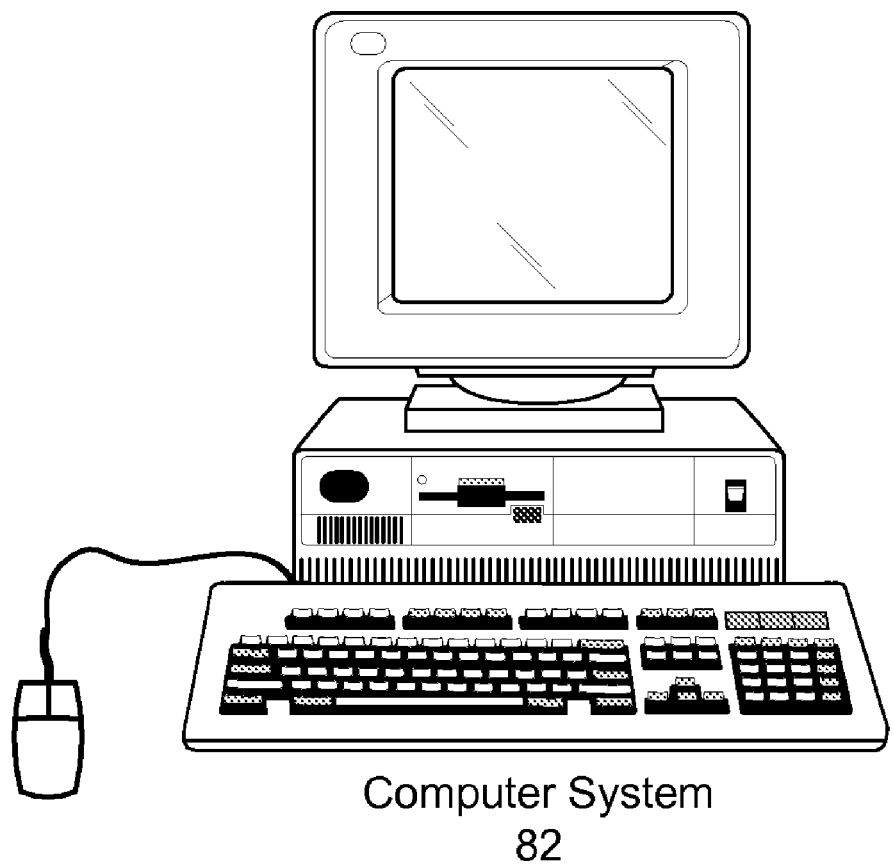
FIG. 1A illustrates a computer system operable to execute a graphical program according to an embodiment of the present invention.

While the invention is susceptible to various modifications and alternative forms, specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION

Incorporation By Reference

The following references are hereby incorporated by reference in their entirety as though fully and completely set forth herein.

U.S. Pat. No. 5,481,741 titled "Method and Apparatus for Providing Attribute Nodes in a Graphical Data Flow Environment," issued on Jan. 2, 1996.

U.S. Pat. No. 6,102,965 titled "System and Method for Providing Client/Server Access to Graphical Programs," issued on Aug. 15, 2000.

U.S. Pat. No. 6,437,805 titled "System and Method for Accessing Object Capabilities in a Graphical Program" filed Aug. 18, 1998.

U.S. Patent Application Publication No. 20010020291 (Ser. No. 09/745,023) titled "System and Method for Programmatically Generating a Graphical Program in Response to Program Information," filed Dec. 20, 2000.

U.S. Pat. No. 6,173,438 titled "Embedded Graphical Programming System" filed on Aug. 18, 1997, whose inventors were Jeffrey L. Kodosky, Darshan Shah, Samson DeKey, and Steve Rogers.

U.S. Pat. No. 6,219,628 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

U.S. Pat. No. 7,028,222 titled "Target Device-Specific Syntax and Semantic Analysis For a Graphical Program" filed on Jun. 21, 2002, whose inventors were Newton G. Petersen and Darshan K. Shah.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums that may reside in different locations, e.g., in different computers that are connected over a network.

Carrier Medium—a memory medium as described above, as well as a physical medium such as a bus or network that carries signals such as electrical, electromagnetic, or digital signals.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums or media that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicates functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab, DiaDem and Matrixx/SystemBuild from National Instruments, Simulink from The MathWorks, Inc., VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, a unit under test, a process being measured or controlled, another computer program, a database, or a file. Also, a user may input data to a graphical program or virtual instrument using a graphical user interface, e.g., a front panel.

A graphical program may optionally have a GUI associated with the graphical program. In this case, the plurality of interconnected nodes is often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires. Also, the elements of a syntax tree are referred to as nodes, which may include various node types.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Computer System

FIG. 1A illustrates a computer system 82 suitable to implement various embodiments of the present invention. More specifically, computer system 82 may execute software for automatically generating at least a portion of a graphical program in response to a textual program, where for example, the software implements a graphical software tool. One embodiment of a method for receiving a textual program and automatically generating the graphical program that implements the specified functionality is described herein.

As shown in FIG. 1A, the computer system 82 may include a display device operable to display a textual program. The display device may also display the resultant graphical program automatically created from the textual program.

The computer system 82 may include a memory medium(s) on which one or more computer programs or software components according to one embodiment of the present invention may be stored. For example, the memory medium may store a textual program. The memory medium may also store a program for performing automatic conversion of the textual program to a graphical program. The memory medium may further store the resultant graphical program. Also, the memory medium may store a graphical programming development environment application used to create, compile, interpret, and/or execute such graphical programs. The memory medium may also store operating system software, as well as other software for operation of the computer system. Various embodiments further include receiving or storing instructions and/or data implemented in accordance with the foregoing description upon a carrier medium.

The computer system 82 preferably includes or stores a computer program for automatic conversion of textual programming code into graphical code, also referred to herein as conversion code. One embodiment of a method for automatically converting textual code into a graphical program is described below. It should be noted that although the conversion code may be a stand-alone executable program, in various embodiments, the computer program may be implemented in different ways, including, but not limited to, a standalone utility, a plug-in for a graphical development environment, an integrated portion of a development environment, a graphical application programming interface (API), a network service in a client-server environment and so forth.

In one embodiment, the computer program for automatic conversion of textual programming code into graphical code may be implemented as a self-contained program or application that includes all necessary program logic for generating the graphical program. In another embodiment, the computer program for automatic conversion of textual programming code into graphical code may comprise a client portion and a server portion (or client program and server program), wherein the client portion may request or direct the server portion to perform various aspects of the interface and/or generation functionality. For example, the client portion may utilize an API provided by the server portion in order to generate the graphical program. In other words, the client portion may perform calls to the API provided by the server portion, and the server portion may execute functions or routines bound to these calls to process the textual code and generate the graphical program. In one embodiment, the server portion may be an instance of a graphical programming development environment application. For example, the Lab-VIEW® graphical programming development environment application enables client programs to interface with a Lab-VIEW® server in order to automatically generate or modify graphical programs.

In some embodiments, rather than generating the graphical program directly, the conversion code may generate program instructions (sometimes referred to as a "graphical program generation program" or "GPG program") which may then be executed to generate the graphical program. Thus, in one embodiment, the conversion code be used to generate a graphical program generation (GPG) program which itself is executable to create the graphical program. In one example embodiment, the GPG program is generated using XML.

As used herein, the term "GPG program" is intended to include any of various implementations of a program (or programs) that are executable to automatically generate a graphical program based on received program information. For example, the term "GPG program" is intended to include an embodiment in which the GPG program is a self-contained program or application that includes all necessary program logic for automatically generating a graphical program. The term "GPG program" is also intended to include an embodiment in which a combination of a client portion (or client program) and server portion (or server program) operate together to automatically generate the graphical program. The term "GPG program" is also intended to include other program implementations. A GPG program may include specific syntax for describing operations or steps for assembling graphical block diagram code. A GPG program may take as input a textual program or a script for assembling a graphical block diagram.

In an embodiment in which a client program interfaces with a server program to generate the graphical program (or scripts), the server program may execute on the same computer system as the client program or may execute on a different computer system, e.g., a different computer system connected via a network. For example, in FIG. 1B, the client program may execute on the computer system 82, and the server program may execute on the computer system 90. In this case, the graphical program, and/or script, may be created on the computer system 82, or 90, or on a different computer system. Thus, the conversion code may be distributed over a plurality of computers, or may be executed on a single computer.

It is noted that the conversion code may be implemented using any of various programming technologies or methodologies. Where the conversion code is implemented as client and server programs, each of these programs may utilize procedure-based techniques, component-based techniques, and/or object-oriented techniques, among others. The programs may be written using any combination of text-based or graphical programming languages. Also, the programs may be written using distributed modules or components so that each program may reside on any combination of computer system 82, computer system 90, and other computer systems connected to the network 84. Also, in various embodiments, the client program may interface with the server program through a proxy software component or program.

Computer Network

Figure 1B:
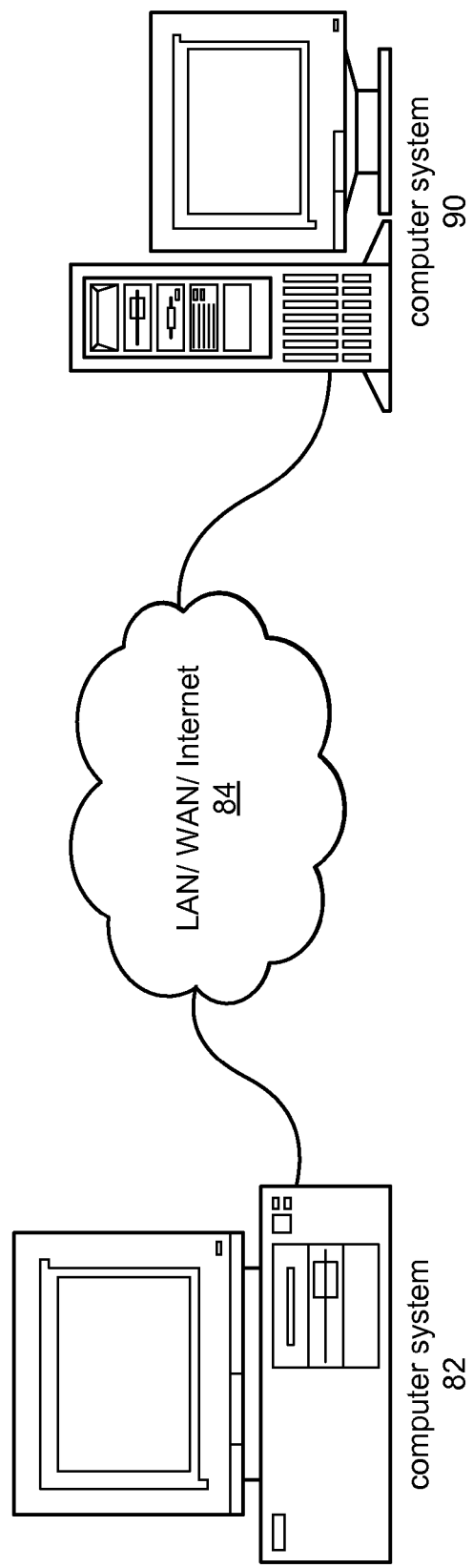
FIG. 1B illustrates a network system comprising two or more computer systems that may implement an embodiment of the present invention.

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute the conversion code in a distributed fashion. For example, computer 82 may execute a first portion of the conversion code and computer system 90 may execute a second portion of the conversion code. As another example, computer 82 may display the graphical user interface of the conversion code and computer system 90 may execute the core functionality of the conversion code.

In one embodiment, the resultant graphical program may be generated for distributed execution. For example, the graphical user interface of the graphical program may be displayed on a display device of the computer system 82, and the block diagram may execute on a device connected to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved in any of various applications, including, but not limited to, numeric computation, numeric analysis, modeling and simulation functions, performing test and/or measurement functions; controlling and/or modeling instrumentation or industrial automation hardware, e.g., modeling or simulating a device or product being developed or tested, etc. Exemplary test applications where the automatically converted graphical program may be used include hardware-in-the-loop testing and rapid control prototyping, among others.

However, it is noted that embodiments of the present invention can be used for a plethora of further applications and are not limited to the above applications, but rather it is contemplated that the textual code, and the graphical code automatically converted from the textual code by the methods described herein, can be used for any application domains desired. In other words, applications discussed in the present description are exemplary only, and embodiments of the present invention may be used in any of various types of systems. Thus, the system and method described herein are operable to be used in any of various types of applications, such as word processing, spreadsheets, network control, network monitoring, financial applications, games, etc.

Instrumentation and Industrial Automation Systems

Figure 2A:
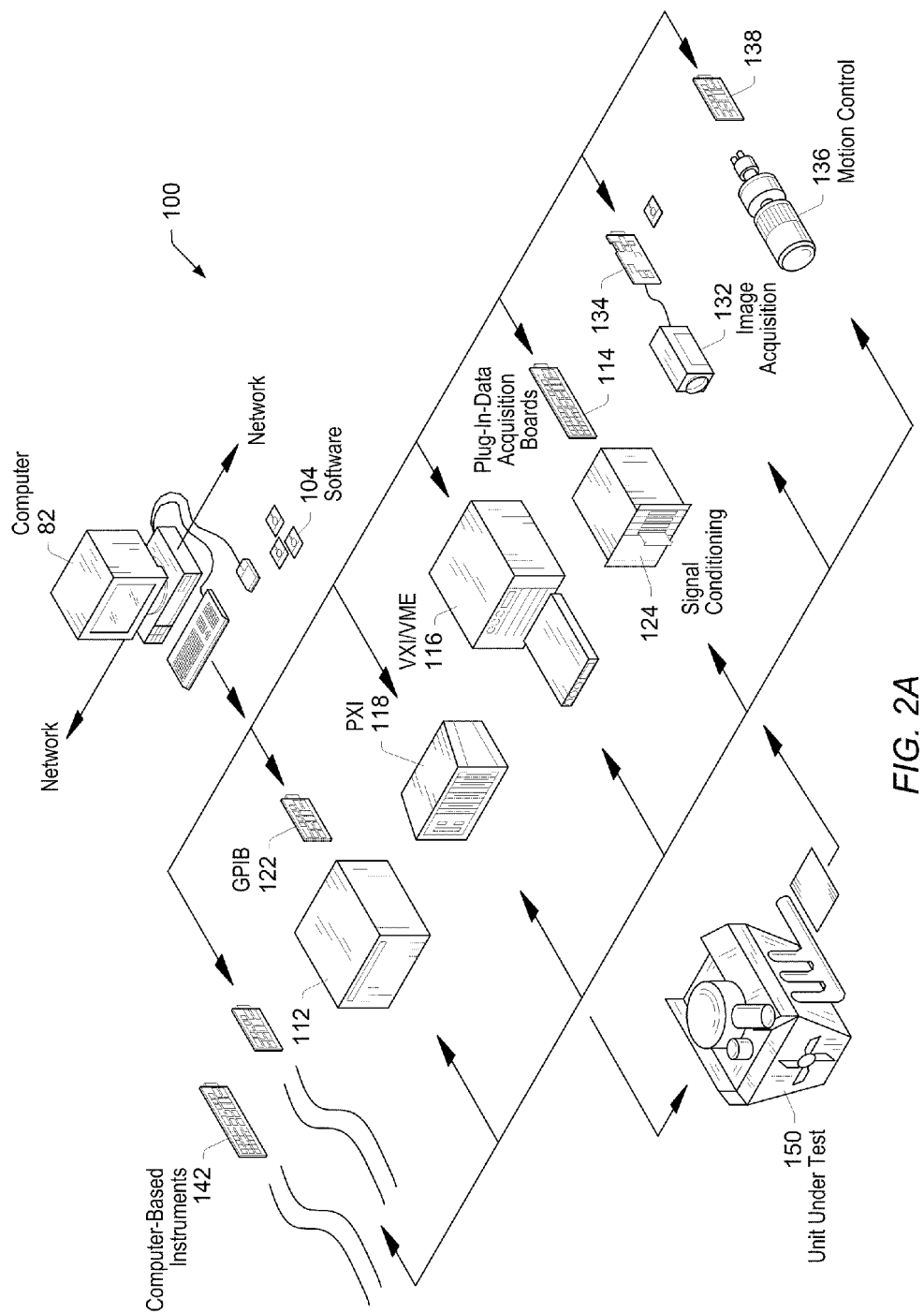
FIG. 2A illustrates an instrumentation control system including various I/O interface options, according to one embodiment of the invention.
Figure 2B:
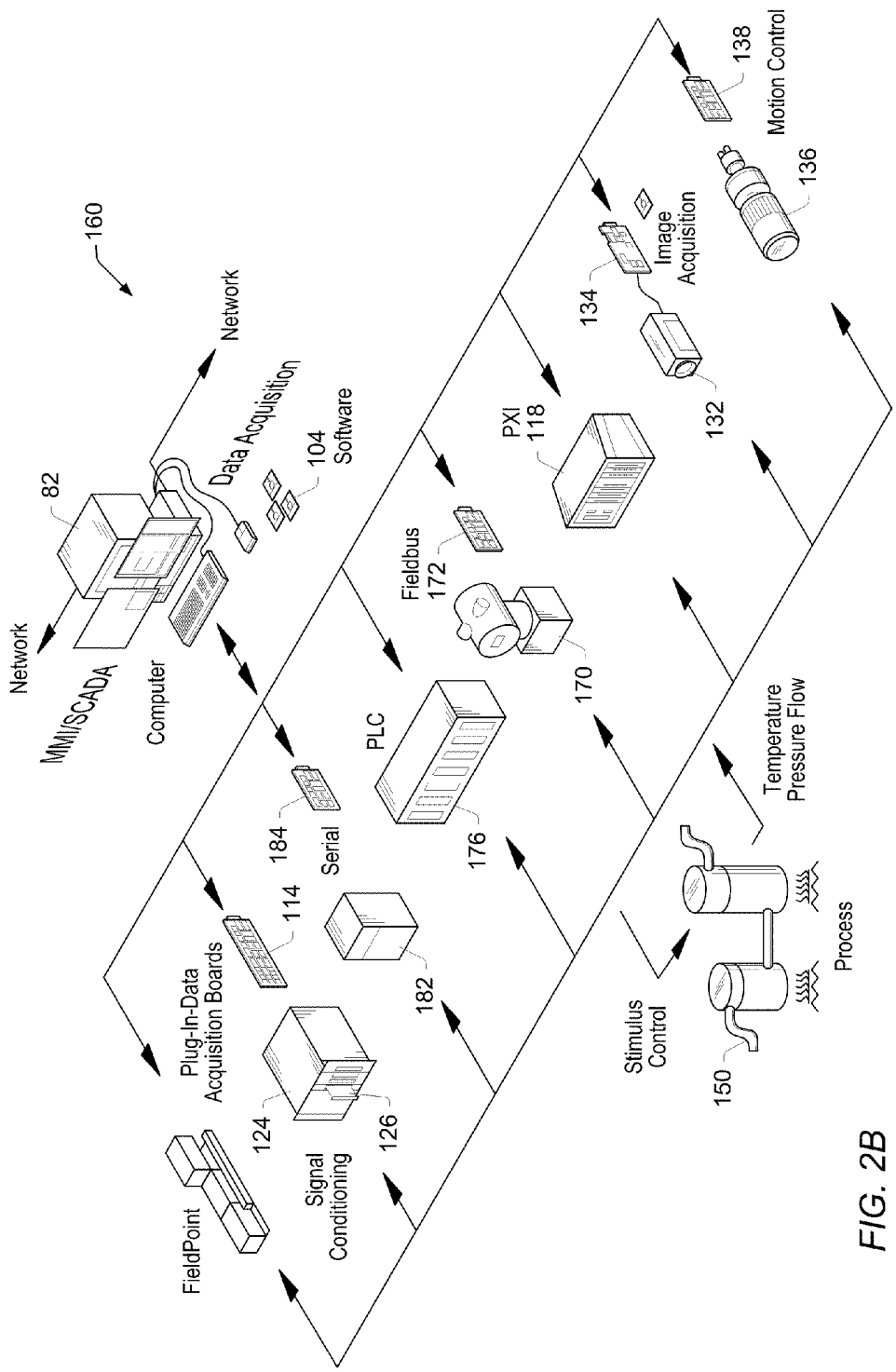
FIG. 2B illustrates an industrial automation system including various I/O interface options, according to one embodiment of the invention.

FIGS. 2A and 2B illustrate exemplary systems that may store or use conversion code (optionally with a server program) that is operable to create a graphical program or a portion of a graphical program. Also, these systems may execute an automatically generated graphical program from a textual program. For example, the graphical program may perform an instrumentation function, such as a test and measurement function or an industrial automation function. It is noted that the conversion code, the server program, and/or a generated graphical program may be stored in or used by any of various other types of systems as desired and may implement any function or application as desired. Thus, FIGS. 2A and 2B are exemplary only.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In one embodiment, the conversion code and/or the resulting graphical program that is automatically generated may be designed for data acquisition/generation, analysis, and/or display, and for controlling or modeling instrumentation or industrial automation hardware. For example, in one embodiment, the National Instruments LabVIEW® graphical programming development environment application, which provides specialized support for developers of instrumentation applications, may act as the server program. In this embodiment, the client program may be a software program that receives and processes program information and invokes functionality of the LabVIEW® graphical programming development environment. The client program may also be a program involved with instrumentation or data acquisition.

However, as noted above, the present invention can be used for a plethora of applications and is not limited to instrumentation or industrial automation applications. In other words, FIGS. 2A and 2B are exemplary only, and graphical programs for any of various types of purposes may be generated by conversion code designed for any of the various types of purposes, wherein the programs are stored in and execute on any of various types of systems. A specific example of conversion code directed at math scripts for numerical analysis, and graphical programs generated therefrom are discussed below.

Figure 3A:
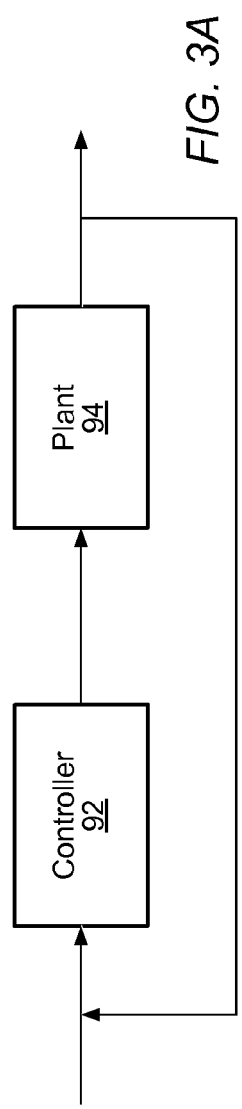
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may select or create a textual code program, such as a MATLAB® m-file, which may then be converted into a graphical program, that specifies or implements the functionality of one or both of the controller 92 and the plant 94. For example, a control engineer may use a modeling and simulation tool and embodiments of the invention described herein to create a model (graphical program) of the plant 94 and/or to create the algorithm (graphical program) for the controller 92.

Figure 3B:
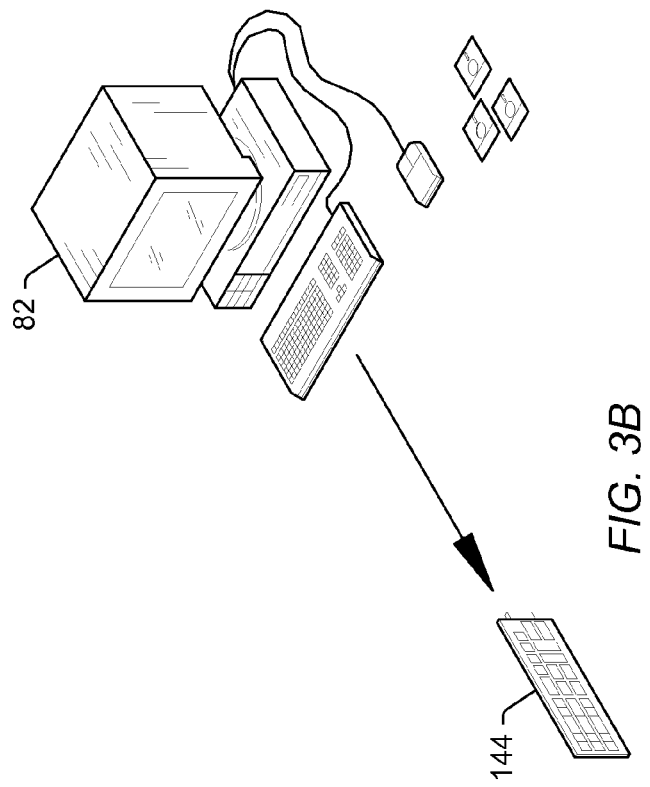
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program created as described herein. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created as described herein which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created as described herein which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program created as described herein) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs that perform data acquisition, analysis and/or presentation, e.g., for measurement, instrumentation control, industrial automation, modeling, or simulation, such as in the applications shown in FIGS. 2A and 2B, may be referred to as virtual instruments.

Computer System Block Diagram

Figure 4:
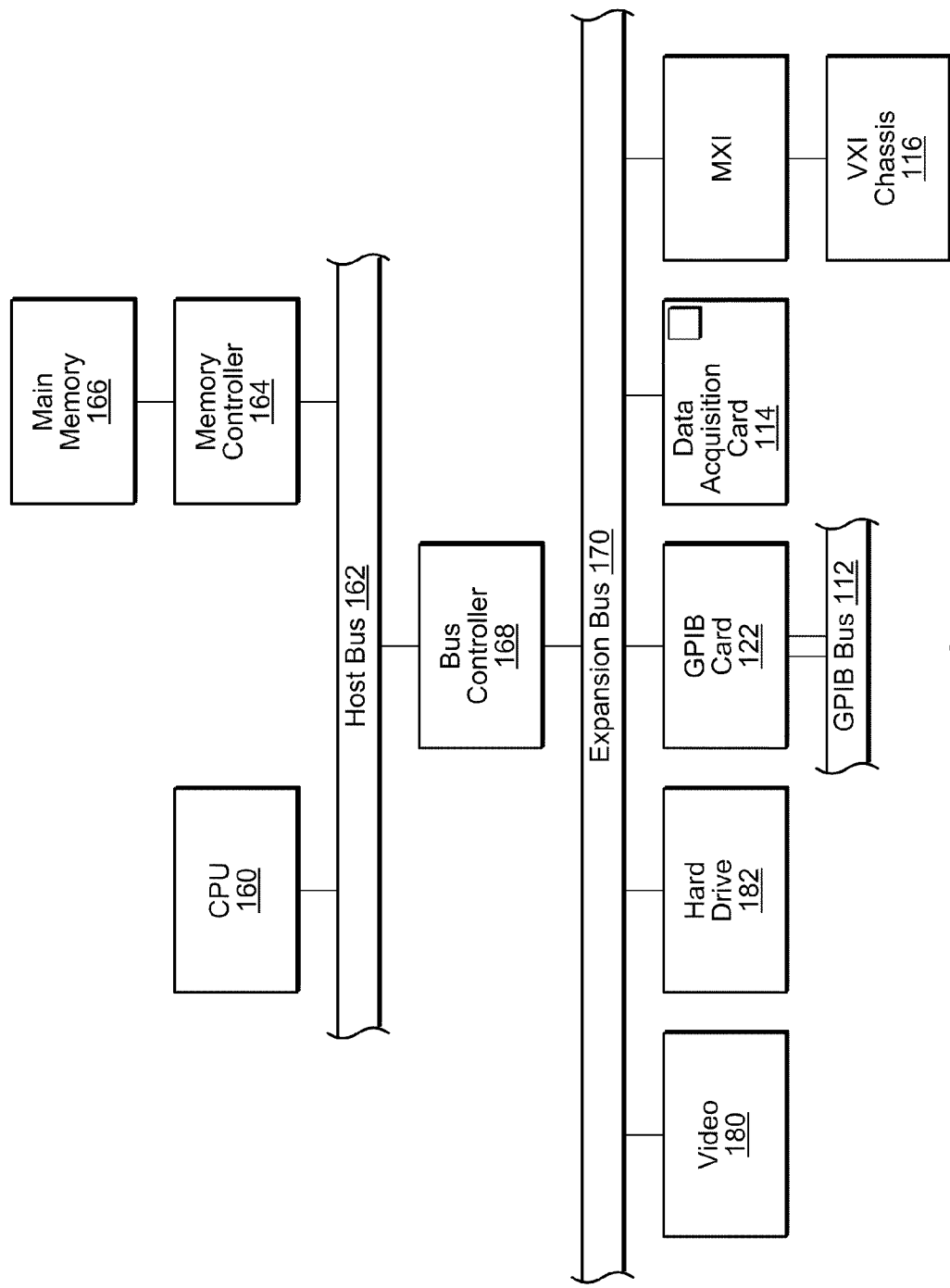
FIG. 4 is an exemplary block diagram of the computer systems of FIGS. 1A, 1B, 2A and 2B and 3B.

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the conversion code operable to automatically generate at least a portion of a graphical program, e.g., graphical code, in accordance with a user-specified configuration. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

An additional device may also be connected to the computer (not shown). The device may include a processor and memory which may execute a real time operating system. The device may also or instead comprise a programmable hardware element. The computer system may be operable to deploy a graphical program to the device for execution of the graphical program on the device. The deployed graphical program may include graphical programs automatically converted from textual program code.

Conversion Method

In one embodiment, the conversion method described herein is used for the execution of a program that is originally specified in a textual programming language. In this embodiment, when the textual program is desired to be executed, e.g., in response to input from the user, the textual program is first converted into a graphical program representation (e.g., a LabVIEW® data flow diagram). The graphical program representation (e.g., the LabVIEW® data flow diagram) may then be compiled into machine code for execution on a computer system, or may be interpreted for execution.

Figure 5:
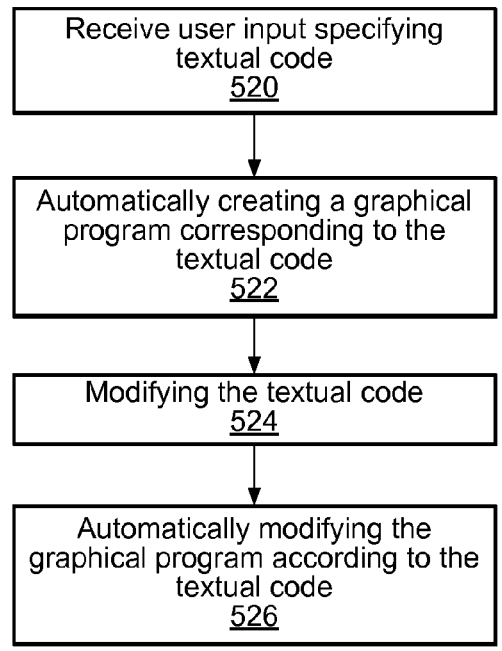
FIGS. 5, 6A, 6B, 7 and 8 are flowcharts illustrating methods for converting a textual program into a graphical program representation, according to one embodiment of the present invention.

The conversion code according to embodiments of the present invention, as illustrated in FIG. 5, may operate in response to receiving textual program code. The first step 520 in FIG. 5 represents receiving user input specifying the textual program or textual code. The textual program code can generally be set of instructions for programming a computer written using the ASCII character set, including BASIC, VisualBasic (Microsoft), C, C++, C# (Microsoft), Java, FORTRAN, Pascal, Delphi® (Borland), COBOL, ADA, APL, PL/I, PERL, etc. Textual program code also includes programs or scripts written in so-called numerical analysis software, such as MATLAB® (The MathWorks, Inc.), COMSOL, GNU Octave, and MathScript™ from National Instruments Corporation, among others.

In step 520, the receipt of the textual code may be accomplished in different embodiments by various methods. The textual program code may be received offline, for example as a batch of instructions in a file from a storage media or a network connection. The textual code may be entered or loaded by the user for conversion and/or execution. The textual program code may also be received and processed transactionally, either as a complete unit of code, or as an individual sequence of code portions. For example, the textual code may be provided as a record in a query from an external host requesting a code conversion service, and the graphical code provided in response to the query; one example of such an implementation is a client/server architecture. A combination of batch and transactional processing techniques may also be practiced in implementing the invention. In one instance, a single line of code is processed during a conversion. In another case, an entire program comprising a plurality of lines of textual code is processed collectively. In one embodiment, a user interface (or GUI) is provided for entering the textual code, and the conversion may be performed in real-time as a background task while the textual code is being entered. Alternatively, the conversion code may be triggered by an explicit command from a user importing or drafting a portion of textual code for conversion. The user interface (or GUI) for providing the textual code may be in the form of a separate stand-alone program environment. In another example, the user interface (or GUI) for providing the textual code is a node in a graphical program.

In an exemplary embodiment, the user may create a MATLAB® M-file or MathScript™ script, or open an existing MATLAB® M-file or MathScript™ script.

After the textual program code has been received in step 520, in 522 the method involves automatically generating a graphical program corresponding to the textual code. The term "automatically generating" refers to generation of the graphical program code without user input specifying the nodes in the graphical program and without user input specifying connections between the nodes. Thus, automatic generation of a graphical program is in contrast to manual creation of a graphical program, which involves the user having to manually select the various nodes and manually specify (e.g., draw) the connections between the nodes to create the program.

The automatic generation of graphical program code in 522 may be performed in response to user input. For example, the user may provide input to run the textual code, such as selecting a run button, which may trigger the automatic generation of graphical code. In one embodiment, when the user provides input to run the textual code, the method automatically generates a graphical program based on the textual code, and the graphical program is then compiled and executed. In another embodiment, when the user provides input to run the textual code, the method automatically generates a graphical program based on the textual code, and the graphical program is then interpreted for execution. The generation and compilation of graphical code may be invisible to the user, i.e., the user may press the run button, and the textual code may seemingly be executed, when in fact the textual code is converted to a separate graphical program and compiled, and this compiled graphical program is then executed. The user may also provide other input to perform the conversion described herein, such as selecting a "convert to graphical program" option.

In various exemplary embodiments, step 522 may comprise a series of operations. In one embodiment, textual code (such as a math script) is processed using a parser, followed by function translation, and code generation, which are themselves programmed using graphical code, to automatically generate graphical code with the same functionality as the textual code. In one embodiment, a parser initially parses a portion of textual code to generate a syntax tree. Then, the syntax tree is used as a template for generating the required graphical code. Generating the graphical code includes translating functions in the textual code along with their associated parameters into the corresponding graphical code versions and data types. A function, subroutine, or program in graphical code may be commonly referred to as a virtual instrument, or simply a VI. The graphical code can be compiled and executed in a graphical programming environment.

The generation of the graphical program code is thus preceded by a parsing routine, which generates a syntax tree, or equivalent structure, representing the textual code. The parsing routine may comprise a lexer and a parser. The lexer reads in the textual code and generates a stream of tokens, which represent the data and operations in the textual code. The parser reads in the stream of tokens and generates the syntax tree. In one embodiment, an open source (i.e., public domain) program may be used to create the parsing routine. In one embodiment, a further step in the parsing routine may comprise the conversion of the syntax tree into a data type of a graphical programming environment, such as an array of records (also referred to as clusters) describing each node in the syntax tree.

The syntax tree may be equivalently replaced with another kind of hierarchical descriptive tool, such as a structure chart or other kind of diagram. Note that the syntax tree, or equivalent structure, describes the hierarchical relationship of tokens present in the received textual code, whereby the hierarchical associations are contained in a data structure, which is actually processed by the methods described herein, and not the actual diagram of the syntax tree.

The parsing routine may also examine the syntax of the textual code for errors, and accordingly stop the conversion process if a syntax error is discovered. Thus, the parsing routine can be aware of syntax rules and syntax violations. In one presently described method, the user is presented with an error message in case of a syntax or compilation error originating in the provided textual code, such that graphical code with compilation errors is never created. In one case where the parser stops the code conversion upon error, the error message presented to the user may include the line number and string identifying the error found in the textual program code. In alternate embodiments, the parsing routine may recognize and convert certain types of syntax errors present in the original textual code, and translate these errors as preserved errors in the graphical code. Still other types of errors in the textual code may have no effect on the parsing routine, but may generate run-time errors during execution of the resulting graphical code. Such run-time errors could result when all the data types and structures in the graphical program have been correctly assembled, but the actual data that is generated is not correctly matched to the given functionality. In still other examples, rules in the parsing routine may be implemented to fix certain types of syntax errors, under assumption of a given set of rules or code conversion preferences; such preferences may optionally be selectable by the end user as global environment settings for the conversion code.

In one implementation of a code conversion, graphical code generation is performed under two iterations. The first iteration generates graphical code from textual code for simple statements, such as simple assignments, operators, simple ranges, identifiers, constants, and simple functions. The second iteration then generates more complex elements which may require additional structure support in graphical code, such as ranges, assignments, rows, matrices, loops, if statements, function calls, switch statements, and expression lists. The order for the conversion of individual nodes in the syntax tree may be bottom up, beginning with functions having no lower hierarchical nodes. In one embodiment, the graphical code is generated without intermediate steps in response to receiving each node of the syntax tree.

In another implementation of a code conversion, graphical code generation is performed in a single iteration to generate all elements present in the textual code. The processing of nodes in the syntax tree may search for unprocessed nodes without children or unprocessed nodes whose children are all processed; this manner of processing would then result in a bottom up code generation of the syntax tree. If no unprocessed nodes are remaining, a post-processing routine may be performed before the code generation completes. For each selected node for processing, the node-type may be determined before performing the code generation for that specific node-type. After the graphical code for a node has been generated, then the node may be marked as processed.

In one embodiment, the code generation routine for a specific node-type may include generating a graphical block diagram, or components thereof, corresponding to the node. The presently described methods also comprise a mechanism for interpreting and storing data types and variables associated with a data type. In one instance, a variant data type permits type casting into any other data type. In one instance, a generic data type is used to represent a variety of data types in the graphical code.

In an alternate embodiment, the code generation, although performed in a single iteration for all nodes in the syntax tree, may be divided into different steps. In an intermediate step, an intermediate set of program instructions (which can be referred to as graphical program generation (GPG) code) may be used to describe the operations necessary for generating the graphical program code. Thus in a first step, each node-type (of tokens in the syntax tree) is processed without actually generating the graphical code itself, but generating a portion of program instructions describing the graphical code. The description of the graphical code may include automated processing steps required to generate the graphical code. The GPG program portions may be assembled and provided to a code generation routine that executes during a post-processing routine. In one example, extensions are defined in a mark-up language, such as XML, for generating the intermediate program instructions describing the graphical code, for example a GPG program. In an alternate example, a language with specific syntax for describing a graphical program may be used.

It should be noted that math scripts are but one example of conversion from textual to graphical code, and that other types of conversion from textual to graphical code (or equivalent) are also contemplated for any application domain desired. Application domains contemplated include, but are not limited to, mathematical algorithms, control algorithms, simulations, instrumentation, test routines, data acquisition, machine vision, and so forth. Note that the specificity of the various domains contemplated may vary widely, and that domains may also be hierarchical. Note that these application domains and sub-domains are meant to be exemplary only, and are not intended to limit the fields, domains, or sub-domains to which automatic code conversion may be directed.

The code conversion need not be dependent on any particular implementation of the graphical program code or user interface architecture. As noted above, the environment, i.e., user interface (or GUI), for receiving the textual code and executing the conversion may effectively mask the conversion to graphical code from the end user. Thus the user interface need not necessarily display the graphical code, but rather the graphical program generation compilation and execution may be performed as a hidden background task. For the end user, such an implementation may not be distinguishable from actually executing the textual code in a textual code execution environment. Conversely, embodiments of the present invention may always display the graphical code to the user for inspection, further editing, debugging and execution in a graphical programming environment. Any combination of the abovementioned user interface schemes will be compatible with the presently described methods of code conversion.

The graphical program may be automatically generated in response to the user input, as in steps 520 and 522. The graphical program comprises a plurality of interconnected graphical program nodes that visually represents the functionality of the graphical program, and is executable to perform the specified functionality. The graphical program may be any of various forms as described herein.

The graphical program may be displayed on a display. Thus the user can view the graphical program, wherein the graphical program provides a more intuitive representation of the operation of the program than the textual code program. The user may then study the operation of the graphical program to obtain a better understanding of the operation of the program. The user may also use various graphical program debugging techniques, such as visual execution highlighting, visual breakpoints, single stepping, etc. As noted above, a graphical program representation may provide a number of benefits, such as improved multithreading and inherent parallelism. In other words, when the textual code is converted to a graphical program, the graphical program may be represented as two or more parallel execution portions (e.g., loops), which can be scheduled for execution on separate processing cores in a multi-core processing system.

In FIG. 5, steps 524 and 526 represent optional further steps in the method in particular embodiments, although the method of FIG. 5 may also be practiced without performing steps 524 and 526. In step 524, the textual code may be further modified. In step 526, the graphical program is automatically modified according to the textual code. Thus, the graphical program may be automatically regenerated in response to a modification of the textual code by the user, as in steps 524 and 526; the modification can be repeated for any number of modifications performed on the textual code.

In various cases, the graphical program code generated by the conversion may be a fully working program, or alternatively may not be a complete program. As an example, the conversion may generate various graphical program elements or nodes that, in conjunction with additional graphical program elements, may comprise a complete program. However, the creation of the partial graphical program may make it relatively easy for the user to complete the graphical program. In still other cases, the present methods automatically generate only a graphical code portion, e.g., that aids the user in program development.

The graphical program may optionally be executed to perform the specified functionality. For example, in one embodiment, user input invoking execution of the graphical program may be received, and the graphical program executed, in response to the invoking. In one embodiment, at least a portion of the graphical program may be targeted for execution on a programmable hardware element. More generally, in various embodiments, various portions of the graphical program may be targeted to respective different targets, including, for example, computers, programmable hardware elements, such as FPGAs, PDAs, embedded systems, such as smart sensors, etc., and/or any other type of target capable of executing graphical program code. For example, different conversions may be performed specifically for generating graphical program portions or features for execution on particular targets. Alternatively, conversions may be performed that are agnostic with regards to target platforms, but which may be configured or specified, to generate graphical program features for specific targets. In other words, the same conversion may generate graphical program code aimed at different targets.

Further details of an example code conversion and its use are provided below.

Programmatic Generation of an Application Domain Specific Graphical Program

Figures 6A, 6B:
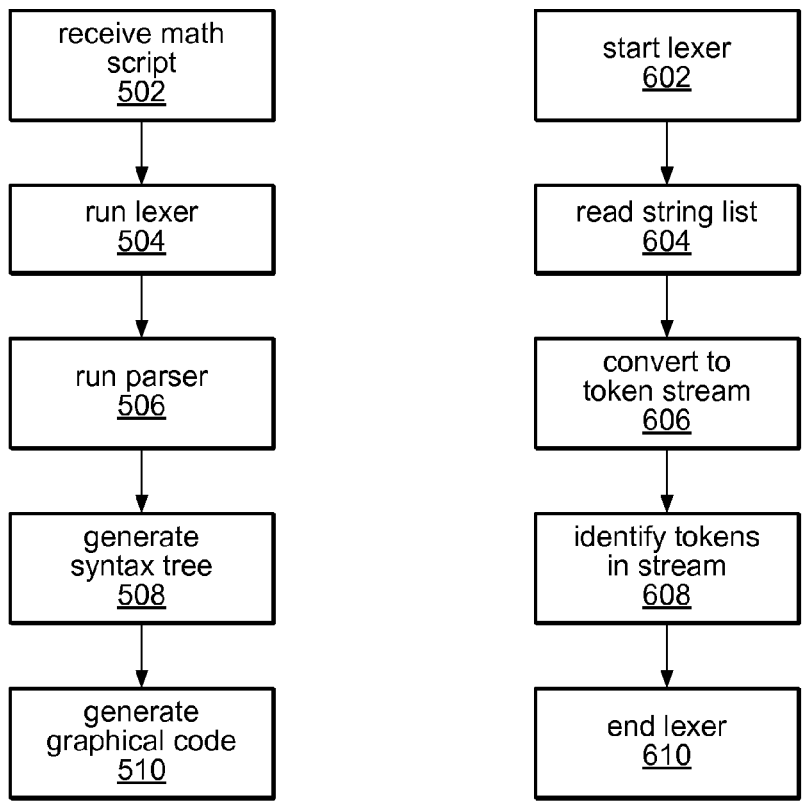

FIG. 6A is a high-level flowchart of an example method for automatically generating a graphical program, where the graphical program functionality is specific to the application domain of numerical analysis such that the textual code is provided in the form of a math script. As noted above, the equivalent functionality may be applied to a plurality of different application domains. The method described below is performed by conversion code that may include a GUI for displaying information to a user and for receiving input from the user, e.g., via a plurality of fields, sections, or panels displayed on a computer monitor. Note that in various embodiments, some of the steps shown may be performed concurrently, in a different order than shown, or omitted. Additional steps may also be performed as desired. In step 502, a math script (representing textual program code) is received. In step 504, a lexer is run using the math script as input. The lexer 504 returns a stream of tokens. One example of lexer 504 is shown in detail in FIG. 6B. In step 506, the parser is run using the stream of tokens as input to generate a syntax tree 508. One example of parser 506 is shown in detail in FIG. 7. Finally, in step 510, the graphical code is generated from the syntax tree. One example of method step 510 is shown in detail in FIG. 8.

In FIG. 6B, in step 602 the lexer is started with the math script as input. The lexer may run on an entire math script or a portion thereof. The lexer reads in the list of strings in step 604. The token stream is generated from the string list by a conversion performed in step 606. The tokens are identified in step 608, which may be a table-based operation. Step 608 may also remove or modify certain tokens in the stream, such as comments or whitespace. In step 610 the lexer finishes and outputs the resulting token stream. Note that FIG. 6 is a high-level flowchart of an exemplary lexer and any particular implementation of a lexer used in conjunction with embodiments of the present invention may involve more or less complexity or include an alternative sequence of operations as shown.

Figure 7:
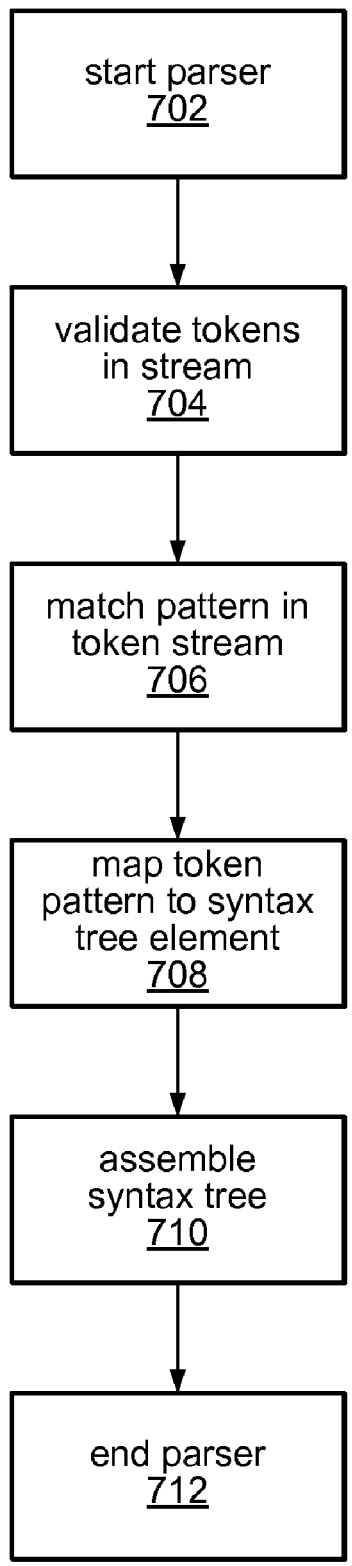

In FIG. 7, in step 702 the parser is started with the token stream from the lexer as input. In step 704 the tokens in the token stream may be validated. In step 706, patterns in the token stream are matched with known syntax patterns. In step 708, patterns of syntax in the token stream are mapped to a syntax tree element (or node). In step 710, the hierarchical relationships in the syntax tree are applied and the syntax tree is assembled. In step 712, the parser ends and outputs the resulting syntax tree. Note that FIG. 7 is a high-level flowchart of an exemplary parser and any particular implementation of a parser used in conjunction with embodiments of the present invention may involve more or less complexity or include an alternative sequence of operations as shown. Also note that the functionality described by steps 504 and 506, or FIGS. 6 and 7, may collectively be referred to as a parsing routine, or even a parser. In other instances, the lexer (or equivalent) may be included as an integrated component of the parser.

Figure 8:
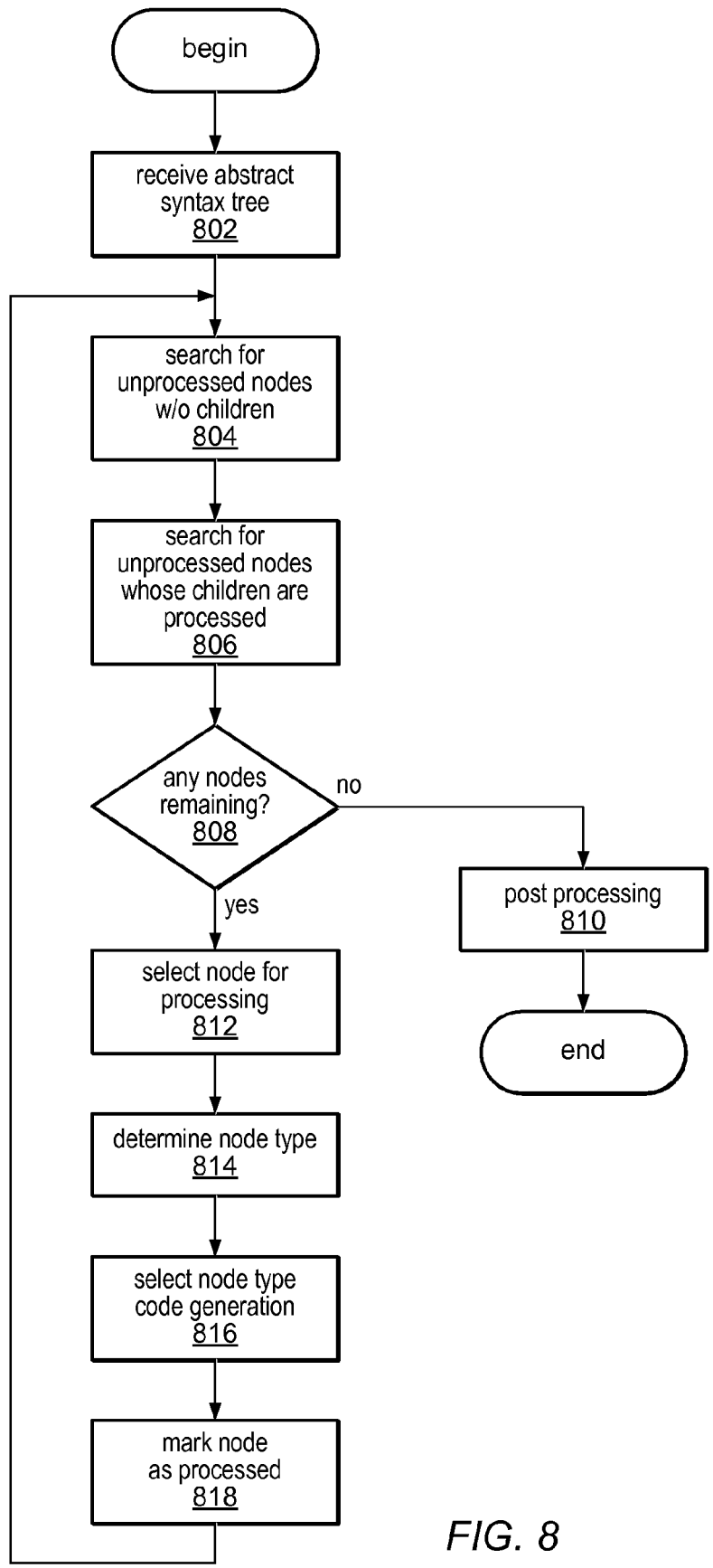

In FIG. 8, the method steps for converting a syntax tree into graphical code are illustrated in flow-chart form. In step 802, the syntax tree is received from the parser. In step 804, the syntax tree is searched for unprocessed nodes without children. If any such nodes are found in step 804, then step 806 may be omitted. In step 806, the syntax tree is searched for any unprocessed nodes whose children are all processed. Note that the particular combination of steps 804 and 806 may be varied or interleaved in various embodiments. In one case, the steps 804 and 806 collectively result in a bottom-up processing of syntax tree nodes. In step 808, a determination can be made if any nodes are remaining; in other words, did the steps 804 and 806 return an unprocessed node. If the result of step 808 is no, i.e., all nodes have been processed, then a post processing routine 810 comprising one or more tasks may be performed before the method completes. If the result of step 808 is yes, i.e., at least one node remains to be processed, then the method continues to step 812, where one particular node is selected. In alternate embodiments, multiple instances of step 812, or equivalent operations selecting multiple nodes for parallel processing may be performed, with the commensurate adaptation or replication regarding steps 814-818. In step 814, the node type for the node is determined. The node type determination provides the ability to implement separate code generation routines depending on the type of node present, as will be discussed in detail below (see FIG. 11). In step 816, the code generation routine for the node type resolved in step 814 is selected and performed. In one example embodiment of step 816, the graphical code is generated for each node type, and the processed designation for each node includes the assembly of the graphical block diagram. In another example of step 816, the code generation is divided into an intermediary step, such that at step 816 program instructions (graphical program generation program) are generated which describe individual steps required for assembling a graphical block diagram for each node type (see also FIG. 10). At step 816, the program instructions for each newly processed node may be cumulatively combined to the previously generated instructions, such that this cumulative generation of the program instructions is used for the processed designation for each node. In one embodiment, the code generation in step 816 is performed in a bottom up manner, wherein each parent node accumulates (or consumes) the program instructions generated by its respective child nodes. In one exemplary implementation, the graphical code may be assembled as one task in post-processing function 810 by executing the final cumulative script. One example of a script language is XML. In another case, a language comprising specific syntax for generating graphical block diagrams may be used to create the intermediate program instructions. In step 818, the node is marked as processed, and the method repeats at step 804.

In one embodiment, the code conversion may use automatic graphical program generation to place specified features or functionality into the graphical program, e.g., into one or more block diagrams. For example, the assistant may determine which features are necessary based on the user input (or program specification), and then may create a batch file or program instructions to automate the graphical program generation. Each feature may then be automatically generated and placed without any further user interaction. In one embodiment, the program instructions may be generated based on the analysis of the user input. Alternatively, the program instructions may have been previously created, where the appropriate program instructions are determined based on the analysis of the user input, and retrieved for execution, e.g., via a look-up table. Thus, in one embodiment, the user input may be analyzed, and one or more sets of program instructions executed to generate the graphical program.

Figure 9A:
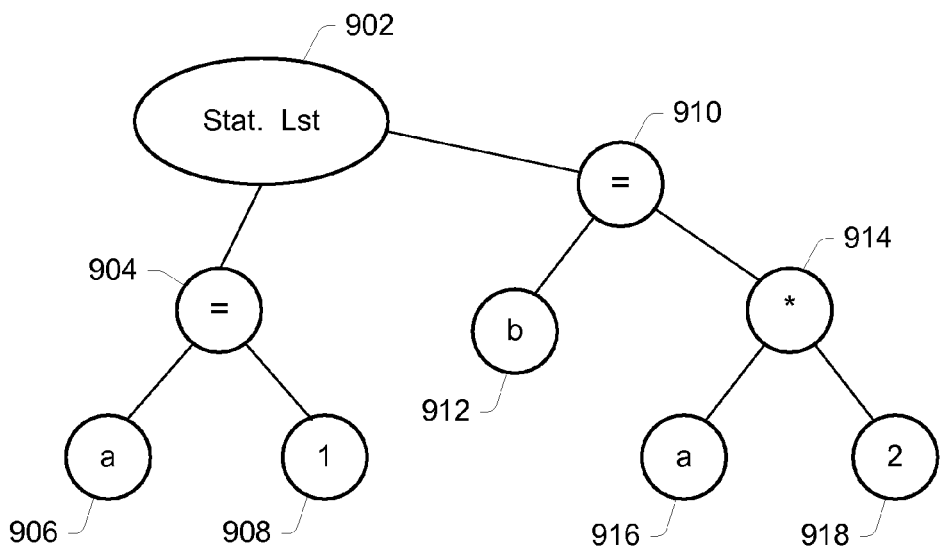
FIGS. 9A and 9B illustrates examples of a syntax tree in an embodiment of the present invention.
Figure 9B:
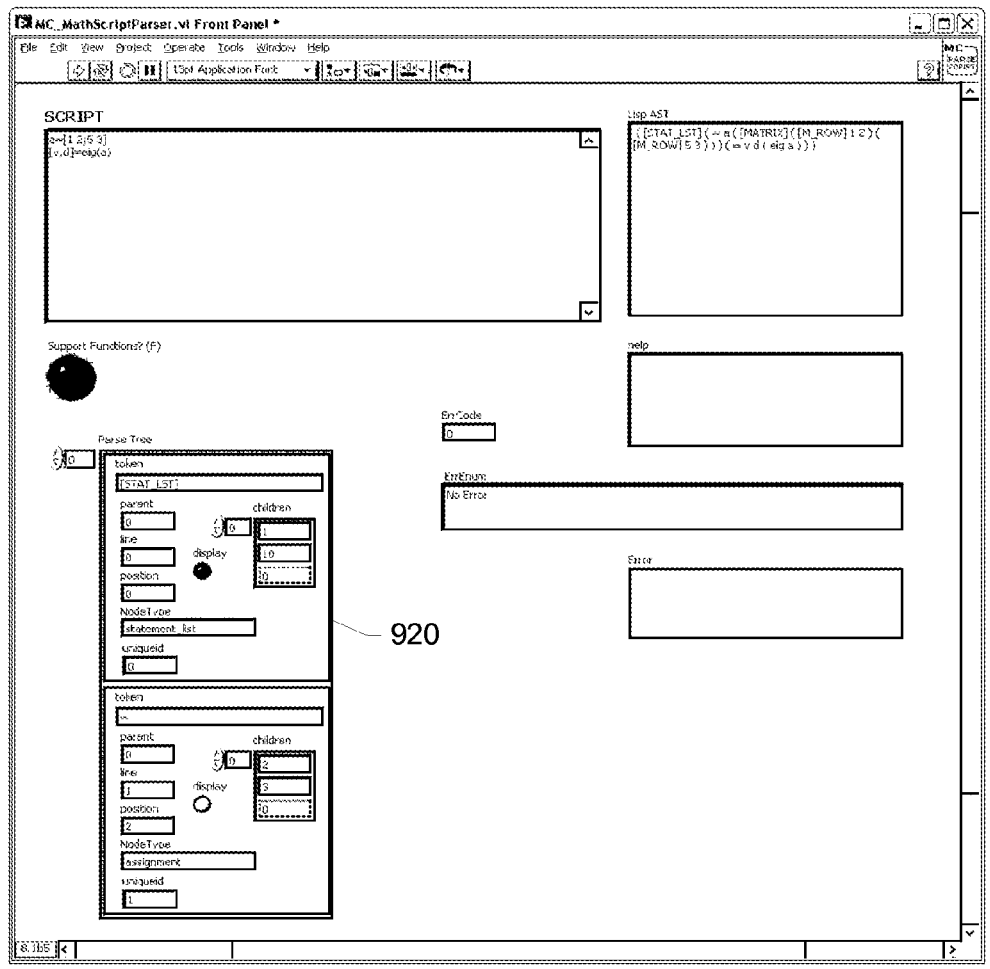

In FIG. 9A, an example of a syntax tree is shown. The syntax tree in FIG. 9A corresponds to the two line program code:

a=1;
b=a*2;

Element 902 is the highest level node representing the entire syntax tree, and is a statement list. Nodes 904-908 represent the first line of the program. Node 906 is the identifier for a, which could be a scalar or matrix variable. Node 904 represents the first assignment operator in the program. Node 908 represents the constant value '1'. Nodes 910-918 represent the second line of the program. Node 912 is the identifier for b, which also could be a scalar or matrix variable. Node 910 represents the second assignment operator in the program. Node 914 represents the multiplication operator. Node 916 is the identifier for a in the second line of the program. Node 918 represents the constant value '2'. The example program and syntax tree illustrated in conjunction with FIG. 9A are shown for illustrative purposes, and can be correspondingly extended to programs of further scope and complexity. In FIG. 9B, a representation of a syntax tree as a native data structure 920 in a graphical programming environment is illustrated. The native data structure 920 is an array of clusters (also known as an array of type record), wherein each element cluster in 920 describes an individual token, i.e., node in the syntax tree, using elements in the cluster describing, among other items for example, the hierarchical relationship to other nodes in the syntax tree.

Figure 10:
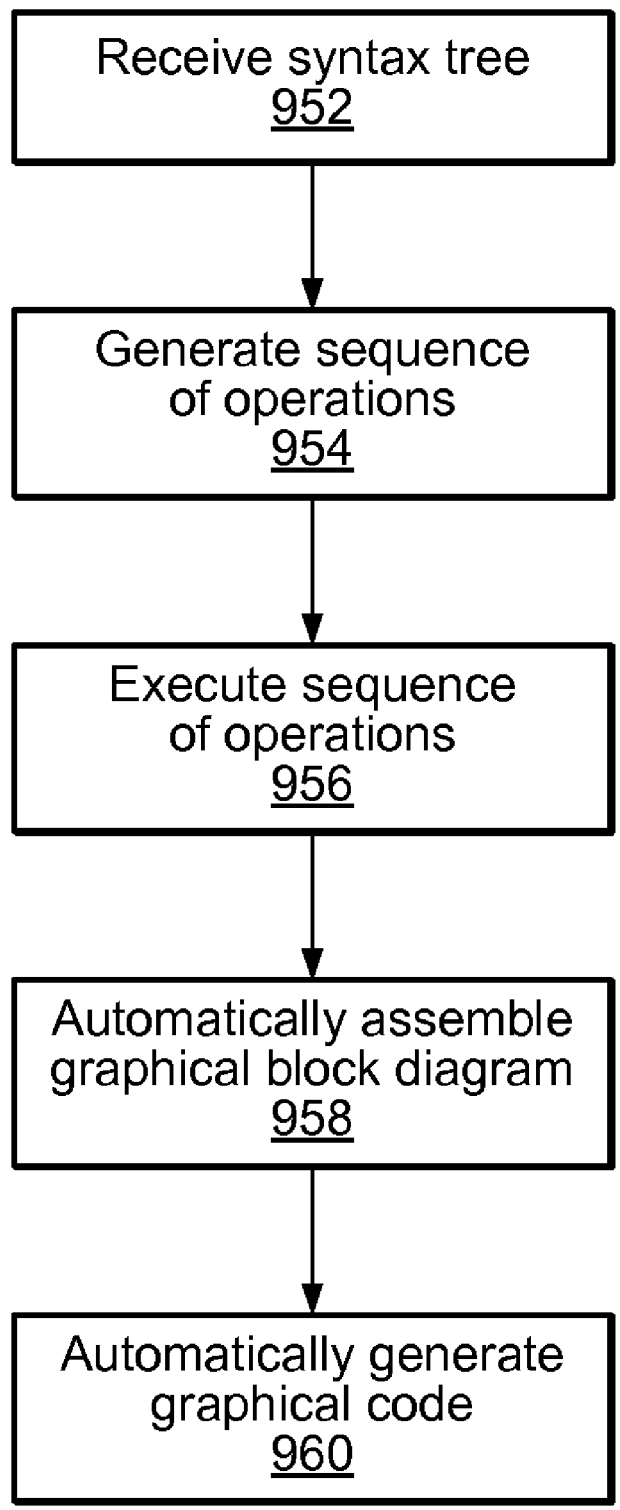
FIG. 10 is a flowchart illustrating a method according to one embodiment of the present invention.

In FIG. 10, another embodiment of the present invention is illustrated as a separate method. In step 952, a syntax tree is received. In step 954, a sequence of operations describing individual steps required for assembling a graphical block diagram is generated. Step 954 may be executed for each node in the syntax tree, in a manner similar to the method shown in FIG. 8, and collectively contain sequences for all nodes in the syntax tree. In step 956, the sequence of operations is executed. The execution in step 956 may be performed for individual steps, or collectively for groups of steps. In step 958, a graphical block diagram is assembled in result of step 956. Note that the combination of steps 954 and 956 may be iterated or interleaved in various embodiments. In step 960 the graphical code corresponding to the functionality described in the syntax tree is generated. FIG. 10 is a high-level flowchart of an exemplary code generation algorithm and any particular implementation thereof used in conjunction with embodiments of the present invention may involve more or less complexity or include an alternative sequence of operations as shown.

In an example embodiment of the present invention described below with respect to FIGS. 11-13, a math script is converted into a graphical program in the LabVIEW® programming environment. In particular, the conversion of a plurality of node types into LabVIEW® is discussed in detail. Note that in order to support a wide variety of variable types and provide support for advanced multi-dimensional math functions, a real or complex matrix data type is generally used. One example of a LabVIEW® data structure for the matrix data type is shown in FIG. 12B, which includes a variant-type variable that can be used to represent generalized data types or plug-in data types. A plug-in data type is a data type associated with a plug-in module that may be separately installed and registered with the system. Variables are stored in a symbol table, and each user-defined function call is equipped with its own symbol table (not shown). A unique identifier (UID) is used to index variables respective to individual nodes. Similar or other conversions for variable types may be equivalently used in embodiments of the present invention practiced in graphical programming environments other than LabVIEW®.

Figure 11:
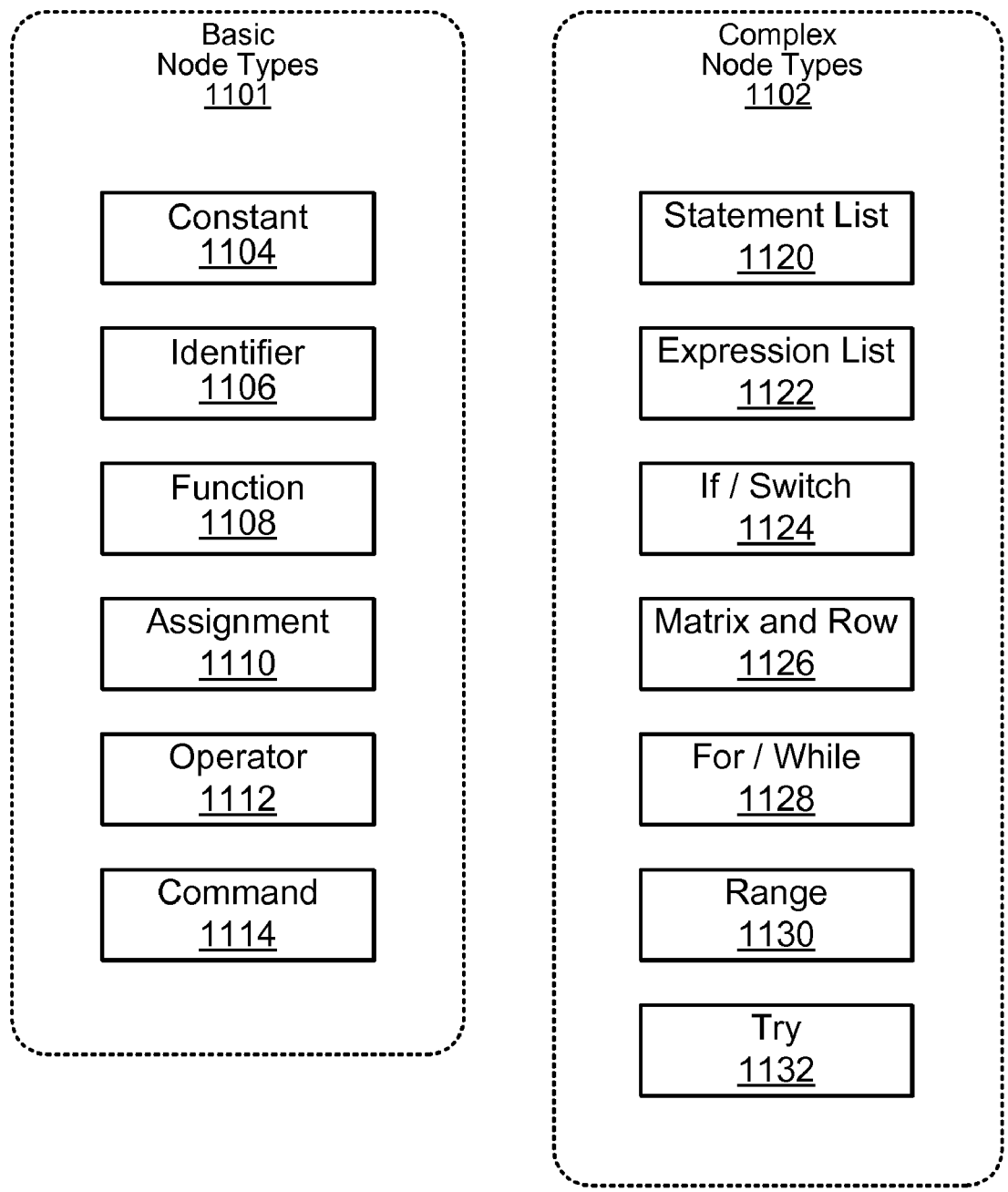
FIG. 11 illustrates node types according to one embodiment of the present invention.

In FIG. 11, further details are presented regarding individual node types and their processing according to one embodiment of the present invention. The list of syntax tree node types is broken into two subgroups: basic nodes and complex nodes. The basic nodes may be implemented by generating predefined virtual instruments (VIs) and simply wiring them together. Examples of basic node type VIs are functions, simple assignments, constant definitions, and reading variables. The complex node types require more advanced generation steps, such as building rows or matrices, dropping one or more subVIs in multiple case statement frames, and more complicated wiring requirements. Nearly every node type has a template VI in which data may be entered in order to be functional. Each node type is examined separately below. In FIG. 11, the Basic Node Types 1101 include: Constant 1104; Identifier 1106; Function 1108; Assignment 1110; Operator 1112; and Command 1114. The Complex Node Types 1102 include: Statement List 1120; Expression List 1122; If/Switch 1124; Matrix and Row 1126; For/While 1128; Range 1130; and Try 1132. In the following discussion, the conversion of the individual node types is described in detail. The VIs referenced by name represent library functions implemented for generating graphical program code in LabVIEW®.

Constant Node Types

Figure 12A:
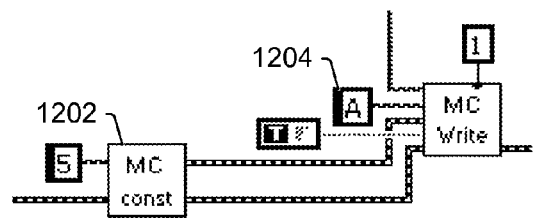
FIGS. 12A, 12B, 12C, 13A, 13B, and 13C illustrate graphical code elements converted from a textual program in an embodiment of the present invention.
Figure 12B:
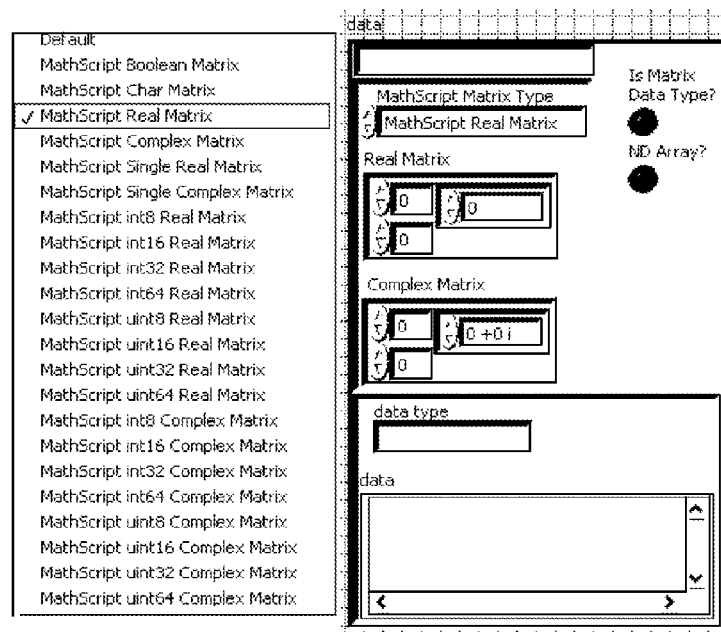

Tokens in the syntax tree are parsed as strings, but an actual string constant is delimited by single quotes. If single quotes are present in the token, the characters are converted to an unsigned 8-bit integer and then stored in a real matrix as doubles. Otherwise, it is assumed that the string represents a number, which is parsed from the token and then put into a real or complex matrix. The generated code for a constant is shown in FIG. 12A. The constant token is dropped, i.e., automatically created by a VI server command on the block diagram, and wired to a token parsing VI, in this case MC_Constant VI 1202. This creates in output an appropriate matrix datatype and sends it to the next node in the data flow diagram.

Identifier

An identifier produces no generated code. It is only valid as a child of an assignment token. This token is only generated for variables on the left-hand side of the assignment. If a variable occurs on the right-hand side of an assignment, it is parsed as a function.

Function

A function node has the following form:
function(expression[_list])
A VI reference is wired to the Function Call VI, which causes the reference function to be executed. The textual name of the function may also be wired to the Function Call VI. Numeric constants wired to the Function Call VI indicate the line number in the original textual code from which the function call originated and the number of outputs that were requested from the function. Certain functions may structure output differently depending on the number of outputs requested.

Functions can have multiple inputs and multiple outputs. In these cases, the inputs are built into an array and wired to an array input to the function. The function may produce an array output for multiple outputs. Not all functions produce an output (e.g., plot). Since variables are processed through the function architecture, they will produce output if their value needs to be displayed.

Assignment

An assignment statement has the following form identifier[_list]=expression

The assignment is implemented using the Symbol Write VI. This writes to the symbol table, which is used to identify and store variables. A simple assignment statement is shown on the right of FIG. 12A, wherein the variable 'A' 1204 is assigned a constant value of '5'. The wire entering from the top of the figure is a unique identifier for this node. The Symbol Write VI also includes the line number in the original textual code, which can be used for reporting in case any errors are generated. The Symbol Write VI has the variable name input and a boolean constant that determines whether anything needs to be written to the output. The Symbol Write VI is polymorphic. If an assignment produces multiple outputs, these outputs will be in an array.

Operator

The operator node is used to represent unary and binary operators. The operators are split into 4 groups: arithmetic, bitwise, logical, and relational. The logical and relational operators are implemented with one VI each, and the operation to be performed is passed to the VI as input (not shown). The arithmetic operator works differently because it can be overloaded by plug-in data types.

Command

Three commands are implemented in the present example: break, continue, and return. They are different from functions because they cannot be overridden to mean anything else. Commands introduce asynchronous behavior for the statement list. A break or continue statement means to skip the remaining lines of a loop and continue execution either on the statement following the loop or at the beginning of the loop. A return statement is typically used in a user-defined function and means to skip execution of the remainder of the function and return to the caller.

Statement List

A statement list is simply a list of statements. The entire math script is parsed with a single statement list node at the top of the syntax tree. However, other nodes such as the if statement, for loop, switch statement, and while loop use statement lists as well. It is generated as a basic state machine (i.e., a case structure indexed within a while loop), since every statement has the possibility of requiring some asynchronous behavior (break, continue, return, error, etc.). In contrast, a LabVIEW® sequence structure is unsuitable because it does not permit stopping execution asynchronously.

Figure 12C:
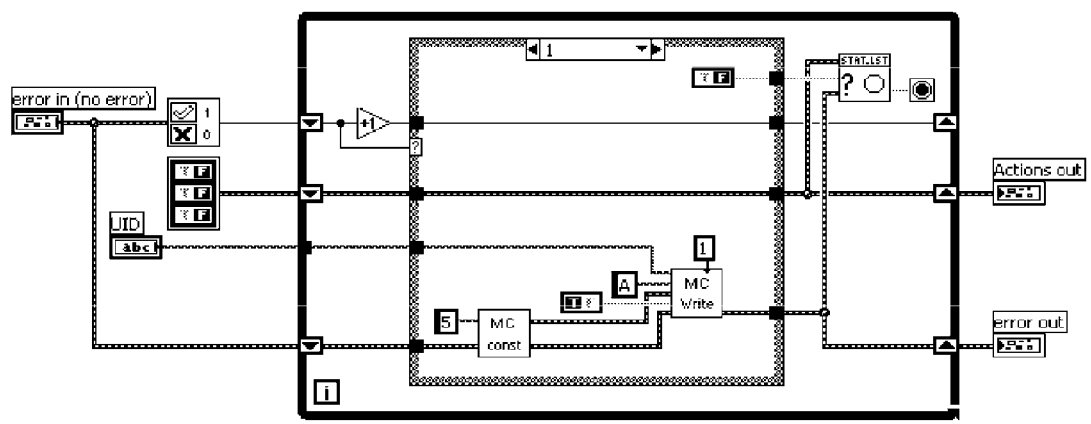

The generated code for the statement list is shown in FIG. 12C. The error in and unique identifier (UID) are provided to the statement list. The cluster of false constants is the actions data structure and it represents if there is a break, continue, or return statement executed. By default, the state machine will start in state 1 and execute each statement sequentially. If there is an error passed in, we start in case 0, which immediately exits the statement list. The actions and error out are examined after every statement to determine if the statement list needs to stop.

Expression List

Figure 13A:
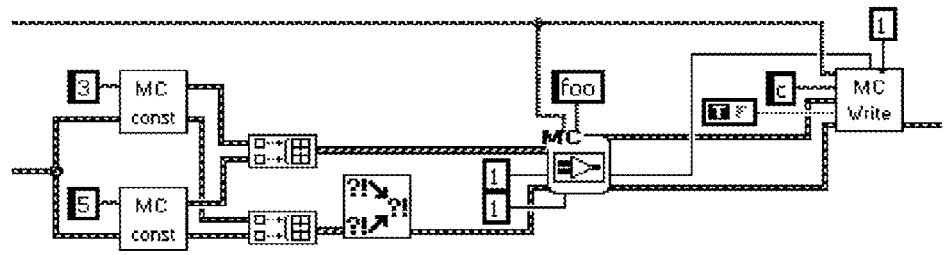

An expression list is always part of a larger code construct that requires multiple expressions. For example, multiple parameters to a function are an expression list. The expression list node is scripted as shown in FIG. 13A. Due to potential side-effects of executing the other children in the case of an error, the error in is wired to all children of the expression list. All of the outputs are formed into an array as output. The errors are also merged so as to produce only a single error out.

If Statement

An if statement has the following form

```
if expression
    statement_list
[else if expression
    statement_list]
...
[else
    statement_list]
end
```

The if-node children are expression and statement-list node pairs representing the condition and statements for the if and else-if cases. If an else case is present, the final child is a statement list representing the else statements. A first loop repeats over all conditional expressions, executing them in order until one is found that evaluates to true. It stops at this point (to avoid any side effects of executing further statements) and sends the current index to a second execution element. The index is used in the second execution element to select the statement list to execute corresponding to the true expression.

Switch Statement

The switch statement is analogous to an if statement and has the following form

```
switch expression
    case expression
        statement_list
    [case expression
        statement_list]
    ...
    [otherwise
        statement_list]
end
```

Matrix and Row

Figure 13B:
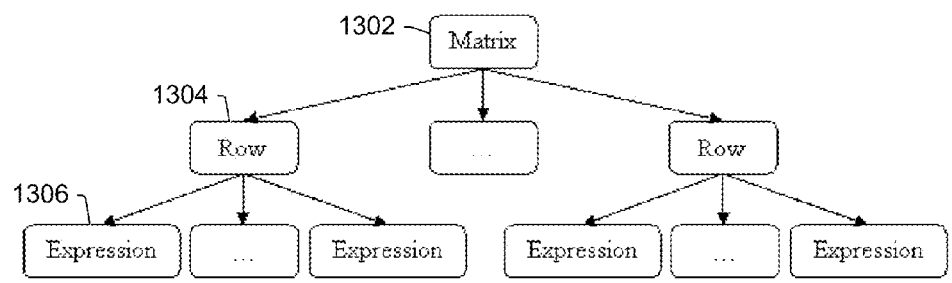

The matrix and row constructs are related as illustrated in FIG. 13B, which shows how a matrix 1302 is formed out of rows 1304, which in turn include expressions 1306. All the expressions are first concatenated in a row array. A Horzcat VI forms the elements into a matrix type for a row. Since the elements of the row can be of different types, the Horzcat VI will also find the appropriate type for the resulting row. Some types are incompatible, such as a complex value and a character or a character and a logical value. The compatibility of types within a matrix is given in a global look up table. Then, all the rows are formed into a 2D matrix array and processed by the Vertcat VI, which will again check for type compatibility among the rows and form them into a matrix of the correct resulting type.

For Loop

A for loop has the following form

```
for identifier = expression
    statement_list
end
```

Although the expression is always assigned to the identifier, only a single identifier is allowed. In one embodiment, multiple identifiers may be realized with nested loops. The expression child may be a range element. The expression is converted into a matrix and the for loop iterates over the columns of this matrix. The for loop in the math script is actually translated into a while loop in LabVIEW® because of the need to support execution control statements like break and continue, since a LabVIEW® for loop always executes a predetermined number of iterations.

While Loop

A while loop has the following form

```
while expression
    statement_list
end
```

The while loop is similar to the for loop, especially since the for loop in the math script is translated to a while loop in LabVIEW®.

Range

Figure 13C:
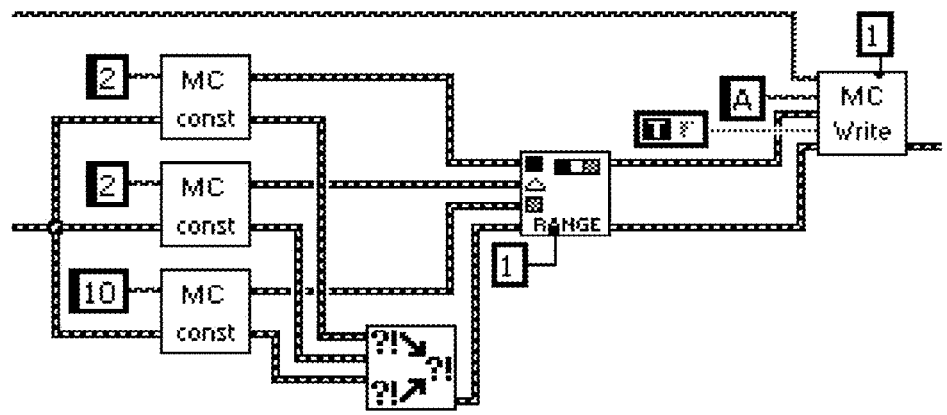

A range structure is formed with the colon operator and has the following form expression:[expression:]expression Each expression should be a real scalar, although if not, only the real portion of the element at the first index is used. The first expression is the start of the range and the last expression is the end of the range. The optional middle expression is the incremental step from the start to the end and, if omitted, defaults to 1. A range structure is generated in LabVIEW® as shown in FIG. 13C. A range is constructed in a loop that generates each element and forms them into a row. If the range will generate more elements than the maximum matrix size, an error will be returned.

TRY

A try block has the following form

```
try
    statement_list
catch
    statement_list
end
```

The try block is used to run a sequence of code without having to stop if an error occurs. If an error occurs, the statements in the catch block are executed.

Figure 14:
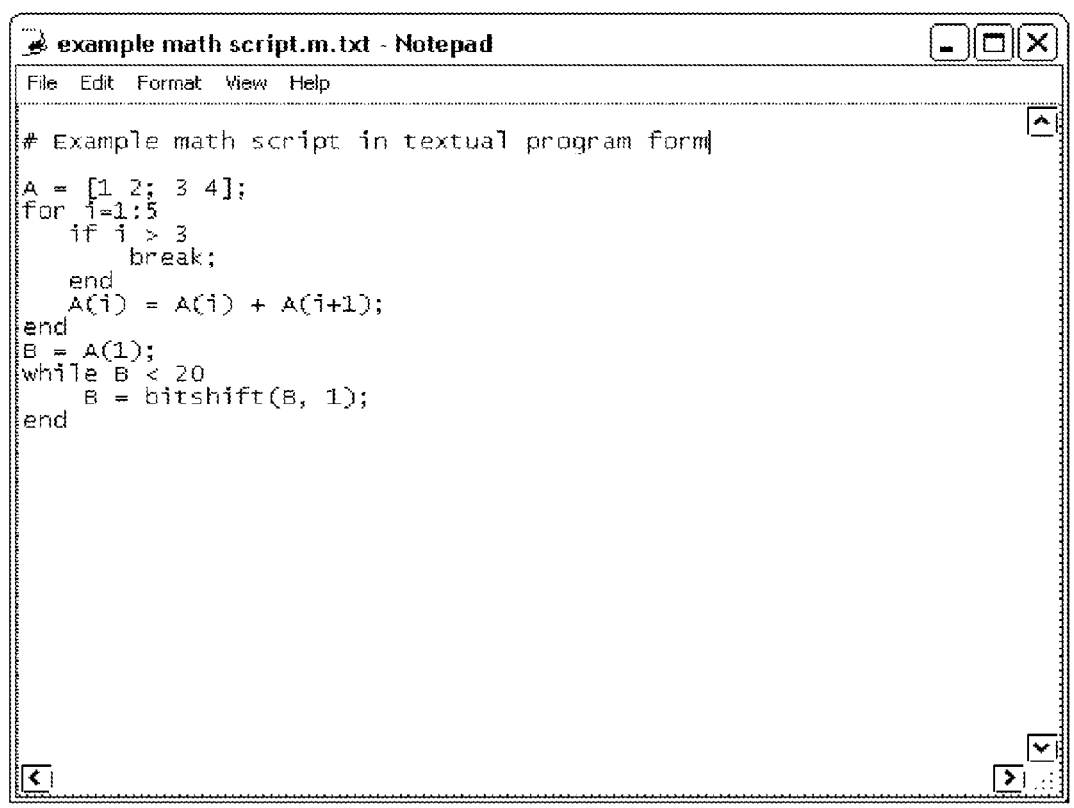
FIG. 14 illustrates an example of a textual program in an embodiment of the present invention.
Figure 15A:
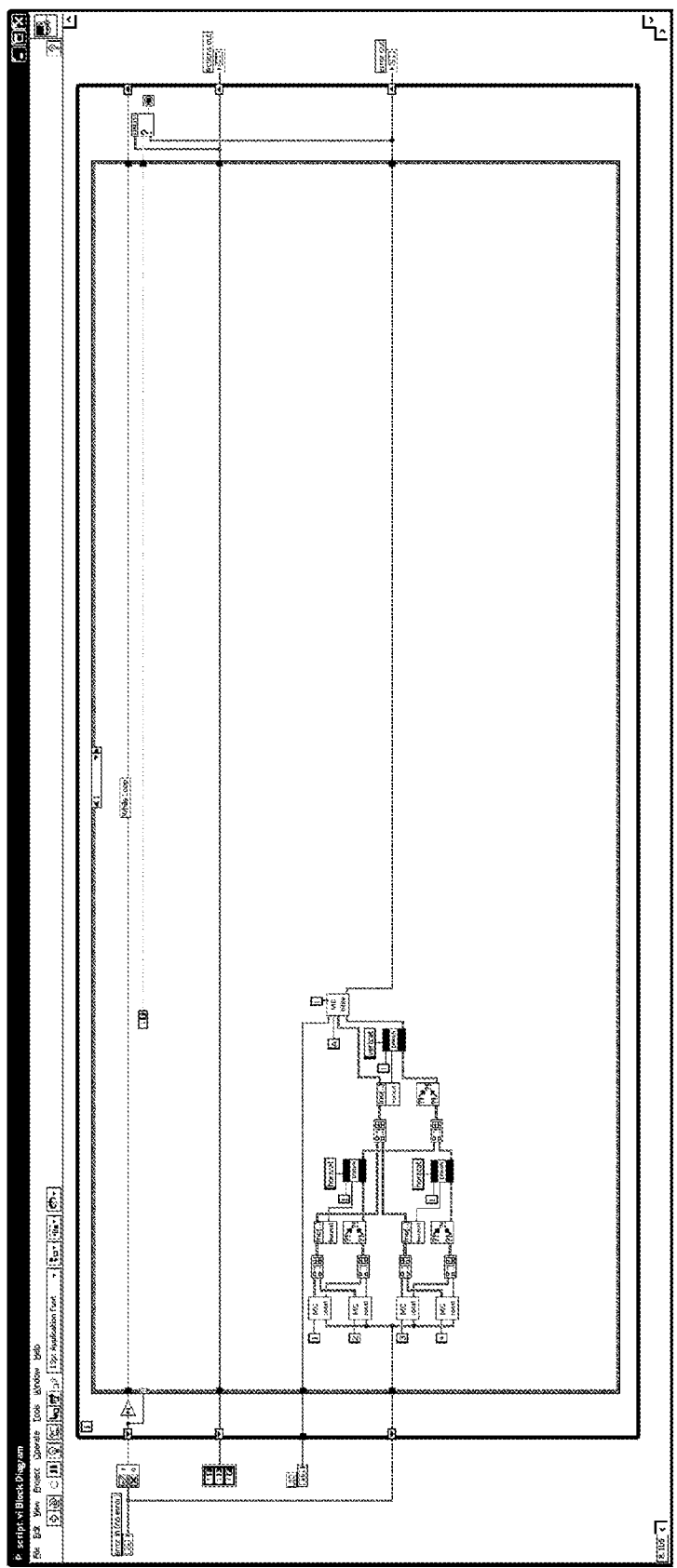
FIGS. 15A, 15B, 15C, 15D, and 15E illustrate an example of an automatically generated graphical program in an embodiment of the present invention.
Figure 15B:
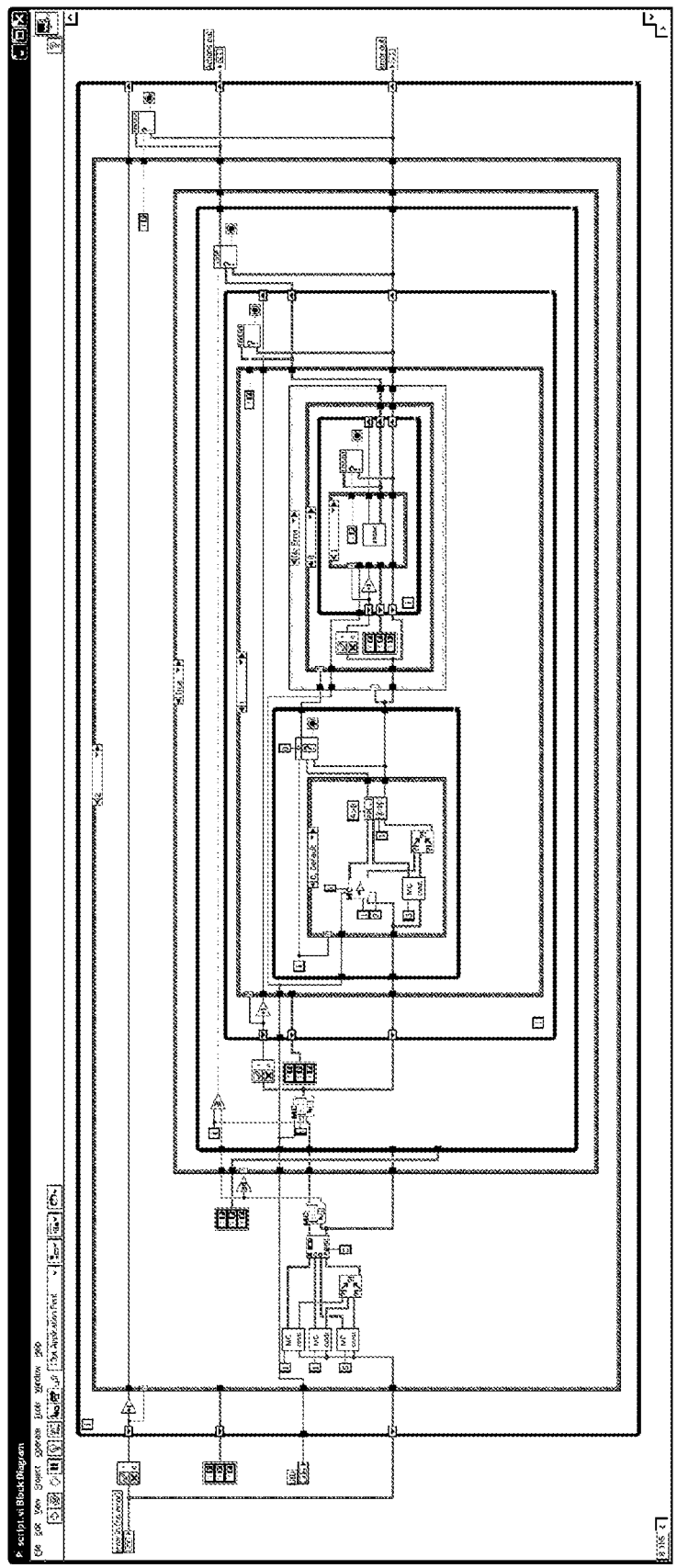
Figure 15C:
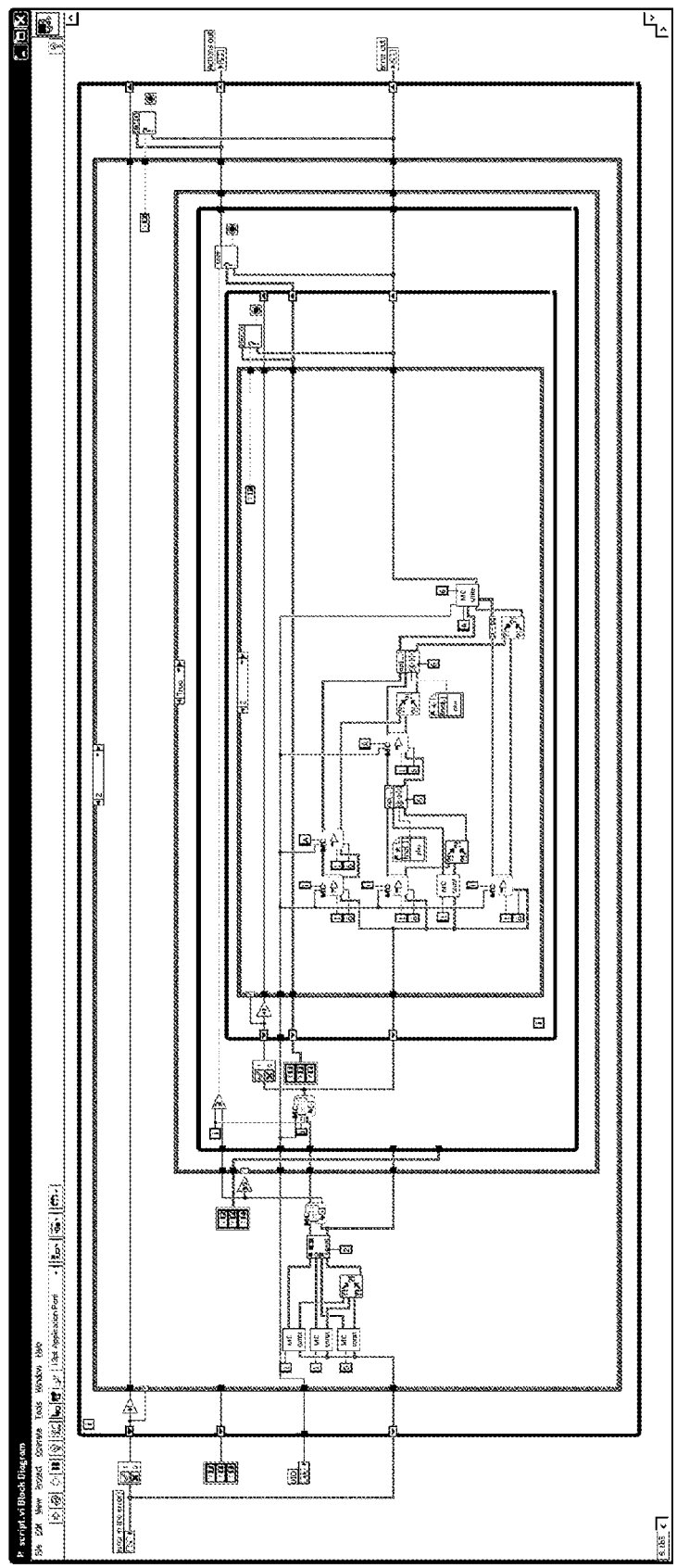
Figure 15D:
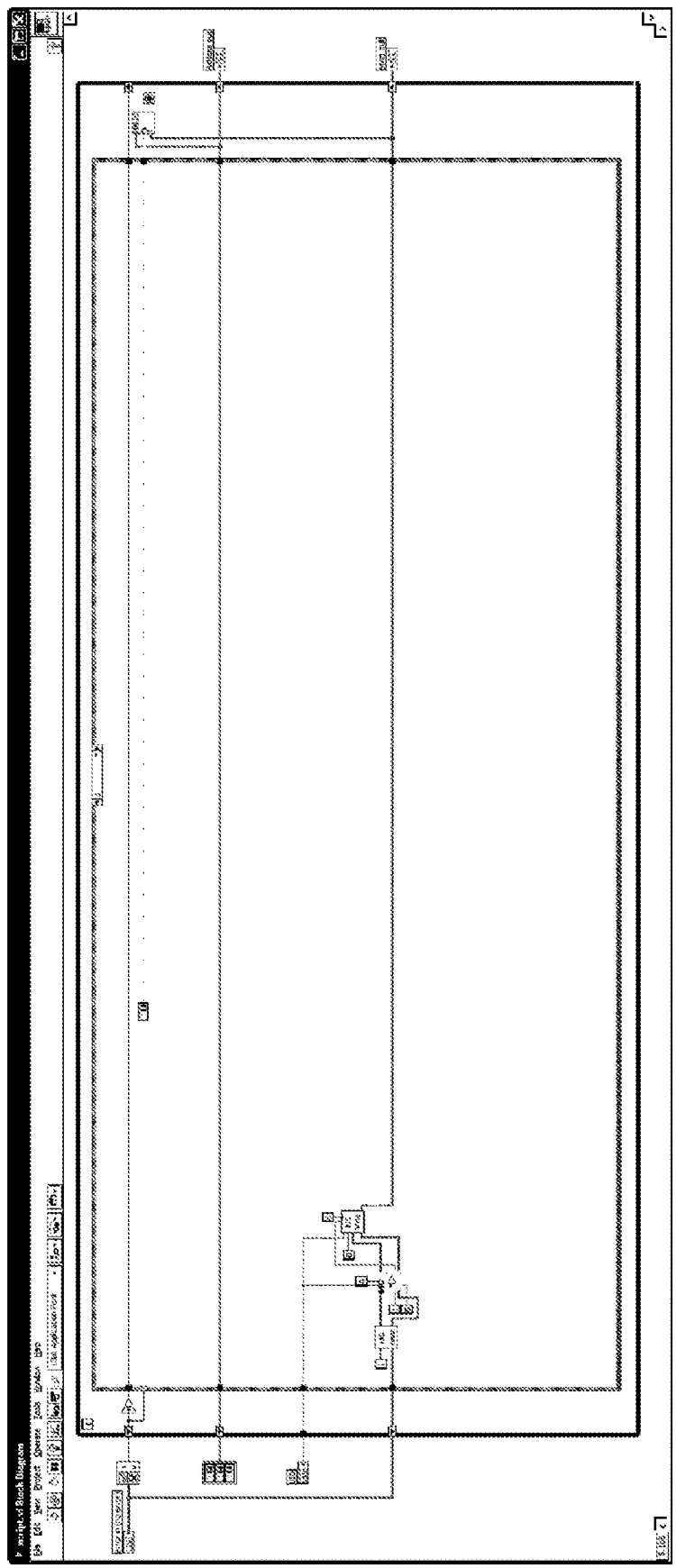
Figure 15E:
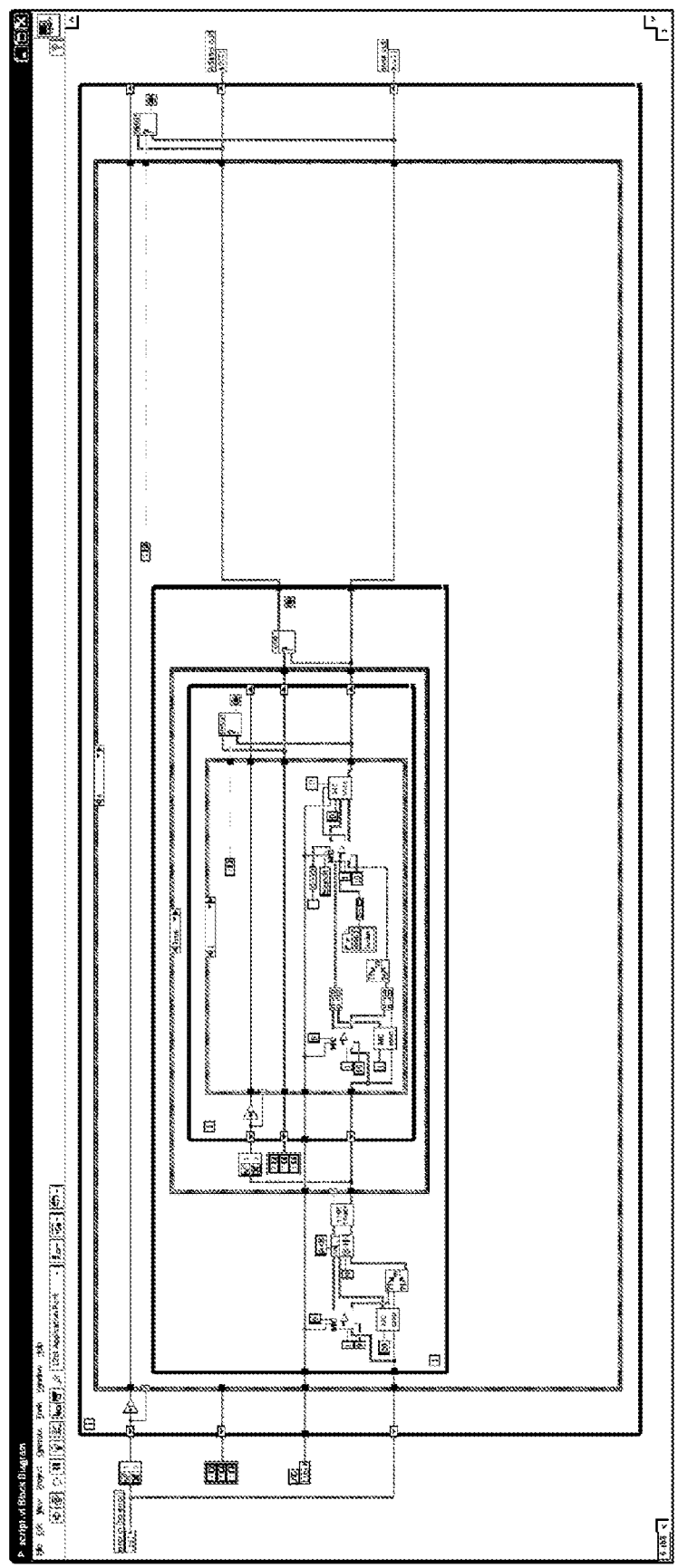

In FIG. 14 an example of a textual program in the form of a math script is illustrated. In FIGS. 15A-E, a graphical program automatically generated from the math script illustrated in FIG. 14 is shown. FIG. 15A shows the graphical code automatically generated for the first line of the math script in FIG. 14, showing generation of a constant, matrix/row, assignment, and statement list. FIG. 15B shows the graphical code automatically generated for the second through seventh line, except for the sixth line, of the math script in FIG. 14, showing generation of a for loop, identifier, range, if statement, function, operator, command, constant, and statement list. FIG. 15C shows the graphical code automatically generated for the second, sixth and seventh line of the math script in FIG. 14, showing generation of a for loop, identifier, range, assignment, function, operator, constant, and statement list. FIG. 15D shows the graphical code automatically generated for the eighth line of the math script in FIG. 14, showing generation of a constant, function, assignment, and statement list. FIG. 15E shows the graphical code automatically generated for the ninth through eleventh line, of the math script in FIG. 14, showing generation of a while loop, operator, function, constant, expression list, assignment, and statement list.

In various cases, the graphical program code generated by the conversion code may be a fully working program. Thus, the user may load the generated graphical program into the graphical programming environment, execute the program, etc. In other cases, the generated graphical program code may not be a complete program. As an example, the conversion code may generate various graphical program elements or nodes that, in conjunction with additional graphical program elements, may comprise a complete program. However, the creation of the partial graphical program may make it relatively easy for the user to complete the graphical program. In still other cases, it may be desirable to automatically generate only a graphical code portion, e.g., that aids the user in program development.

In various embodiments, the conversion code may be operable to generate any of various types of graphical programs. For example, a generated graphical program may be targeted toward a particular graphical programming development environment application, e.g., to utilize proprietary features or to create files that are formatted in a manner expected by the graphical programming development environment. Examples of graphical programming development environments include LabVIEW®, BridgeVIEW, DasyLab, and DiaDem from National Instruments, VEE from Hewlett Packard, Simulink from The MathWorks, Inc., Softwire from Measurement Computing, Inc., Sanscript from Northwoods Software, WiT from Coreco, and Vision Program Manager from PPT Vision, among others.

In one embodiment, the conversion code may facilitate modification of a previously created block diagram or graphical program. For example, in one embodiment, user input may be received via the GUI specifying modification of a previously created textual program, that was converted to a graphical program, such that the graphical program is modified accordingly.

It is further noted that the ability to automatically generate a graphical program having the same functionality as a given textual program enables a graphical program or graphical program portion to be automatically generated even without interactive user input. For example, existing textual code may be reused as native graphical code in a graphical programming environment, without having to reprogram the same code functionality. Automatically converting existing textual code to graphical code enables developers to more rapidly and efficiently integrate programs ranging from simple algorithms to entire heterogeneous platforms, while avoiding errors and testing associated with developing the code from scratch. It is also possible to automatically generate a graphical source code representation of textual code for enhanced visualization of the structure and execution of the code, for example, by making use of graphical debugging features, or by analyzing a diagrammatic version of the data flow in the code.

Many mathematical algorithms have been developed using so-called numerical analysis software, such as MATLAB™ (The MathWorks, Inc.), COMSOL, GNU Octave, and MathScript™. According to embodiments of the invention, the textual code specifying these algorithms, often referred to as scripts or math scripts, can now be directly used as input for automatically generating a graphical program or graphical program portion implementing the specified math script functionality. In many simulation applications, math scripts have been developed that incorporate computational algorithms operating on simulated signals. Integrating simulation math scripts into real-world instrumentation systems is now much easier to accomplish. Once a simulation math script has been automatically converted into a graphical program code, the instrumentation features provided in graphical programming languages, such as in LabVIEW®, become readily available. Furthermore, converting textual code into graphical code in an automatic and reliable manner represents a unique approach in many industrial arts and physical sciences, where the graphical program may be targeted for various target platforms, such as FPGAs, embedded devices, and general purpose computer systems, among others.

Thus, automatic conversion of textual program code to graphical program code may provide significant capabilities to the user, allowing the user to convert functionality of application/domain-specific programs into a graphical programming language, without having to manually construct a graphical block diagram.

Figure 16:
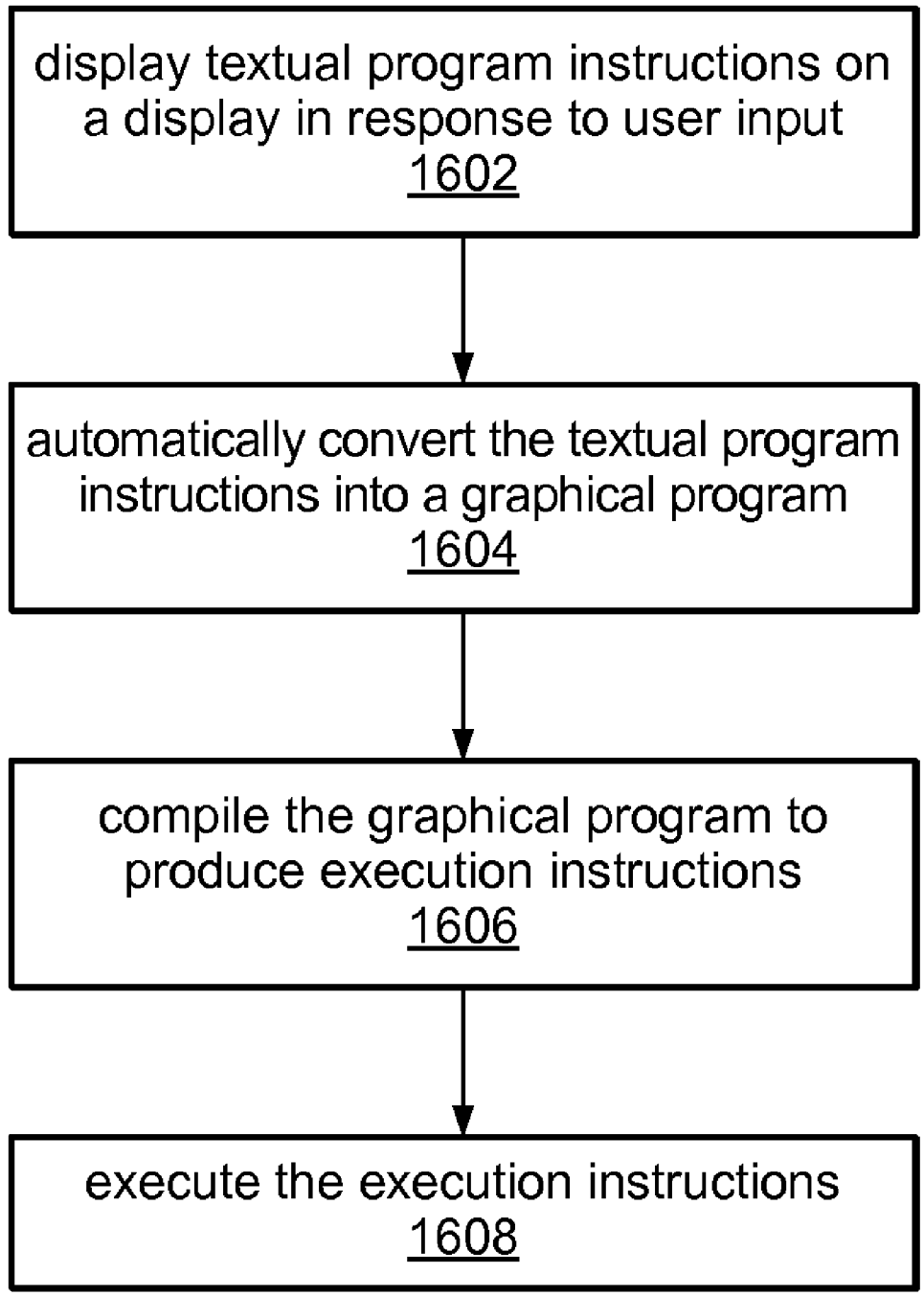
FIG. 16 is a flowchart illustrating an exemplary method for automatically converting textual-based code into a graphical program and executing the newly generated graphical program.

FIG. 16—Method for Converting and Executing Textual-Based Code

FIG. 16 is a flowchart illustrating an exemplary method for converting textual-based code into a graphical program and executing the newly generated graphical program. The exemplary method of FIG. 16 may be used by/in conjunction with any of the systems and methods described herein. Various ones of the steps shown in FIG. 16 may be modified, performed in a different order than shown, or omitted entirely. Additional steps may be added as desired. As shown, the method may operate as follows.

In 1602, textual program instructions may be displayed on a display in response to user input. The textual program instructions may be written in a programming language which includes dynamic types and overloaded functions (e.g., MATLAB® or MathScript™, among others) and may operate to perform a process, e.g., a mathematical process. In some embodiments, the textual program instructions may be displayed in response to the user importing or opening textual program instructions that already exist. For example, the user may simply open a file (e.g., a script file) that is stored in a local or network memory medium. Alternatively, or additionally, the user may specify portions or all of the textual program instructions via an input device. For example, the user may open a template file which includes some textual code and then may enter in more textual code as desired; alternatively, the user may specify all of the textual code. In some embodiments, the textual program instructions may be automatically generated in response to the user input.

The textual program instructions may include a variety of commands and data structures. For example, the textual program may include a function name that resolves to a function of a plurality of possible functions based on a type determined at runtime. More specifically, in one embodiment, the textual program may include a declaration of a function handle. As used herein, the term "function handle" is intended to include a data structure which stores information which is usable to resolve to a function of a plurality of possible functions based on a type. The function handle may capture a particular path or scope which may define the available plurality of possible functions. In other words, the function handle may be used to refer to a plurality of functions and may be usable to select a particular function of the plurality of functions based on type. In one embodiment, the function handle may be similar to the function handle described in U.S. Pat. No. 6,857,118 which was incorporated by reference above.

In some embodiments, the textual program instructions may include one or more scope declarations. A scope declaration may include a definition of a path available to the program at a particular point in the textual program instructions. For example, the scope declaration may define the location of a plurality of helper files (e.g., similar to .h files in C or .m files in MATLAB®, among others) which may include definitions of functions. In other words, the scope declaration/path declaration may indicate (e.g., the location of) the plurality of possible functions described above. Thus, in one embodiment, the textual program instructions may include a scope declaration and a subsequent function handle declaration. In this instance, the function handle may refer to a plurality of available functions, e.g., according to the scope declaration (e.g., the path declared in the scope declaration). Thus, when called in the textual program instructions, the function handle may include references to functions that were in scope according to the scope declaration even if that particular scope has changed (e.g., using a subsequent scope declaration) or is otherwise no longer available.

In 1604, the textual program instructions may be automatically converted into a graphical program. In some embodiments, the automatic conversion may be performed in response to a single user input. For example, the user may simply click a "run" or "convert" button, and the automatic conversion and possibly execution may begin as desired. As described above, the graphical program may include a plurality of interconnected nodes which visually indicates functionality of the graphical program. Additionally, the graphical program may be a graphical data flow program where the connections indicate flow of data between the nodes. The automatic conversion may create the nodes and connections between the nodes without user input specifying the nodes or the connections. In other words, the automatic conversion may not require any user input other than initializing the automatic conversion, e.g., by requesting execution of the textual programming code. Thus, the textual program instructions may be automatically converted and possibly executed in response to a single user input. The conversion of the textual program instructions into the graphical program may be performed via a variety of methods, such as those described above, among others.

In one embodiment, the graphical program may be implemented in a fixed data type programming language (e.g., a fixed data type graphical programming language such as G (LabVIEW®) provided by National Instruments Corporation). Fixed type languages generally require that types be associated with data (via the data structures/variables) at declaration (before run time). C is one example of a fixed type language. In some cases, a fixed type language may allow for variables or data structures to be declared as a generic type(s) and may subsequently use conditional (or case) nodes/structures described below (among other data structures) to choose a function or sub-program based on a specific data type at runtime. In other words, a statically (or fixed) typed language may allow for implementation of dynamic behavior at run time using conditional statements in the fixed typed language. In one embodiment, the "generic" type may be implemented as a cluster of possible data types that may be controlled using conditional statements. For example, the cluster may include one or more data types such as strings, integers, doubles, matrices, etc., and variables may be created for each of these data types at run-time. When data is actually processed at run-time, a conditional statement may be used to populate the appropriately typed variable and call the respective appropriate function(s) for that type. Thus, the inclusion of conditional statements and/or clusters in a fixed type language such as G provided by National Instruments Corporation may allow the subsequent graphical program to implement the dynamic typing represented in the textual program code.

As described above, converting the textual program instructions into the graphical program may include creating at least one conditional structure in the graphical program. In some embodiments, the conditional structure may be operable to receive the type (e.g., of a variable or data structure) and may be usable to invoke execution of a respective function of the plurality of possible functions based on the received type, as determined at runtime. In other words, the conditional structure may be used to select an appropriate function based on type. In some embodiment, the conditional structure may use an array of VI references (sub-graphical program references), wherein each of the VI references represents or implements a corresponding function.

For example, where the textual program instructions refer to calculating, for example, absolute value of a variable, a conditional structure may be generated in the graphical program that determines which absolute value function (or VI) should be called based on the type of the variable. Note that different absolute value functions are generally required for multiple types. For example, a different absolute value function may be required for complex numbers, scalars, and matrices (among others). In one embodiment, the graphical code created to accomplish selecting the respective absolute value function may include a data structure of function references (VI references), where each function reference represents a particular absolute value function.

In some embodiments, the conditional structure may correspond to selection of the plurality of possible functions described above. In other words, during conversion, the function handle (or some other structure relating the plurality of possible functions to be resolved using types) may be implemented as a conditional structure in the graphical program which allows appropriate functions to be called based on type. More specifically, in one embodiment, the conditional structure may store or refer to the functions available in the scope of the plurality of possible functions. Additionally, or alternatively, the conditional structure may refer to sub-programs or virtual instruments included in the graphical program. These sub-programs or virtual instruments may be converted functions. Thus, the conditional structure may store or refer to a plurality of virtual instruments (VIs) which corresponds to functions in the textual program instructions; additionally, the conditional structure may be used to select/invoke an appropriate virtual instrument of the plurality of virtual instruments based on received types (e.g., of data in the wires connected to the conditional structure). Thus, the graphical program may include a conditional structure which allows different functions and/or virtual instruments to be called based on types of data.

Additionally, or alternatively, converting the textual programs into a graphical program may also include creating a graphical sub-program node, e.g., a "call by reference" node, that is operable to invoke a graphical sub-program of a plurality of possible graphical sub-programs based on the received type (e.g., of a variable or data structure) determined at runtime. As indicated above, each of the sub-programs may correspond to the plurality of possible functions. In other words, the functions of the textual program instructions may be converted to sub-programs or VIs of the graphical program. Similar to the conditional structure above, the graphical program may include a node that operates to select one of the sub-programs based on types (e.g., of data of the wires in the graphical program).

Note that in some cases, converting the scope or path declarations in the textual program instructions may not allow for the conditional structures to be fully populated. For example, the textual program instructions may include a scope declaration which assigns the path to a string input by the user at run-time. In such cases, it may not be possible to populate the conditional structures or conditional nodes in the graphical program with the plurality of possible functions (or references thereto). In such examples, in one embodiment, converting the textual program instructions into the graphical program may include creating graphical program code that is operable to, at runtime, determine the plurality of possible functions using the first path declaration. More specifically, converting the textual program instructions may include creating or constructing the conditional structures or nodes at compile time but not populating those conditional structures until runtime. Thus, the newly created graphical program may include code that is able to populate the already constructed conditional structure with the plurality of possible functions at runtime.

In some embodiments, automatically converting the textual program instructions may include determining types of data structures specified in the textual program, and resolving specific functions of the plurality of functions based on the determined types. In other words, the method may determine the types associated with the data structures in the textual program instructions and resolve functions that differ based on types using the determined types. For example, where a function is called that may vary based on the type of the data passed to it, the method may determine which data will be passed to at runtime and resolve the appropriate function before that time, e.g., at compile time. Said another way, the automatic conversion of the textual program instructions to a graphical program may deterministically assign static types and functions to the graphical program and may not dynamically determine functions at runtime. In some embodiments, the determination of the types and the resolution of the functions may be performed substantially at the same time, e.g., coincidentally. This determination and resolution may be performed before run time, e.g., at compile time.

In 1606, the graphical program may be compiled to produce execution instructions (e.g., machine code instructions).

In 1608, the execution instructions (of the graphical program) may be executed. In other words, the newly converted graphical program may be executed. During execution, the procedure originally programmed in the textual program instructions may be performed by the graphical program.

It should be noted that, in some embodiments, 1604 (automatically converting the textual program instructions), 1606 (compiling the graphical program), and 1608 (executing the execution instructions) may all be performed in response to a single user input. For example, in one embodiment, the user may simply click a "run" button, e.g., in LabVIEW®, and the textual program may be converted, compiled, and executed. In some embodiments, the user may not have to input any information to perform these actions; in other words, the user may simply click the "run" button, and all of the above-described steps may be performed automatically without further user input. Thus, according to various embodiments, textual programming instructions may be automatically converted to a graphical program, the graphical program may be compiled into machine code instructions, and the instructions may be executed.

Exemplary Textual Program Instructions and Resulting Graphical Programs

The following code illustrates a portion of exemplary textual program instructions for determining the size of a dynamically typed variable.

a=size(b)

As shown, the textual program instructions include a function name that resolves to a function of a plurality of possible functions based on type. More specifically, in the example above, the program instructions include the function named "size" which references a plurality of possible functions, each of which may be selected based on type, e.g., at runtime. For example, different functions may be used according to the data type of the argument "b" received by the "size" function, wherein the "size" function returns the size of the data represented by the argument "b". As a more specific example, there may be a first size function for matrices and a second size function for polynomials (among other types).

Figure 17:
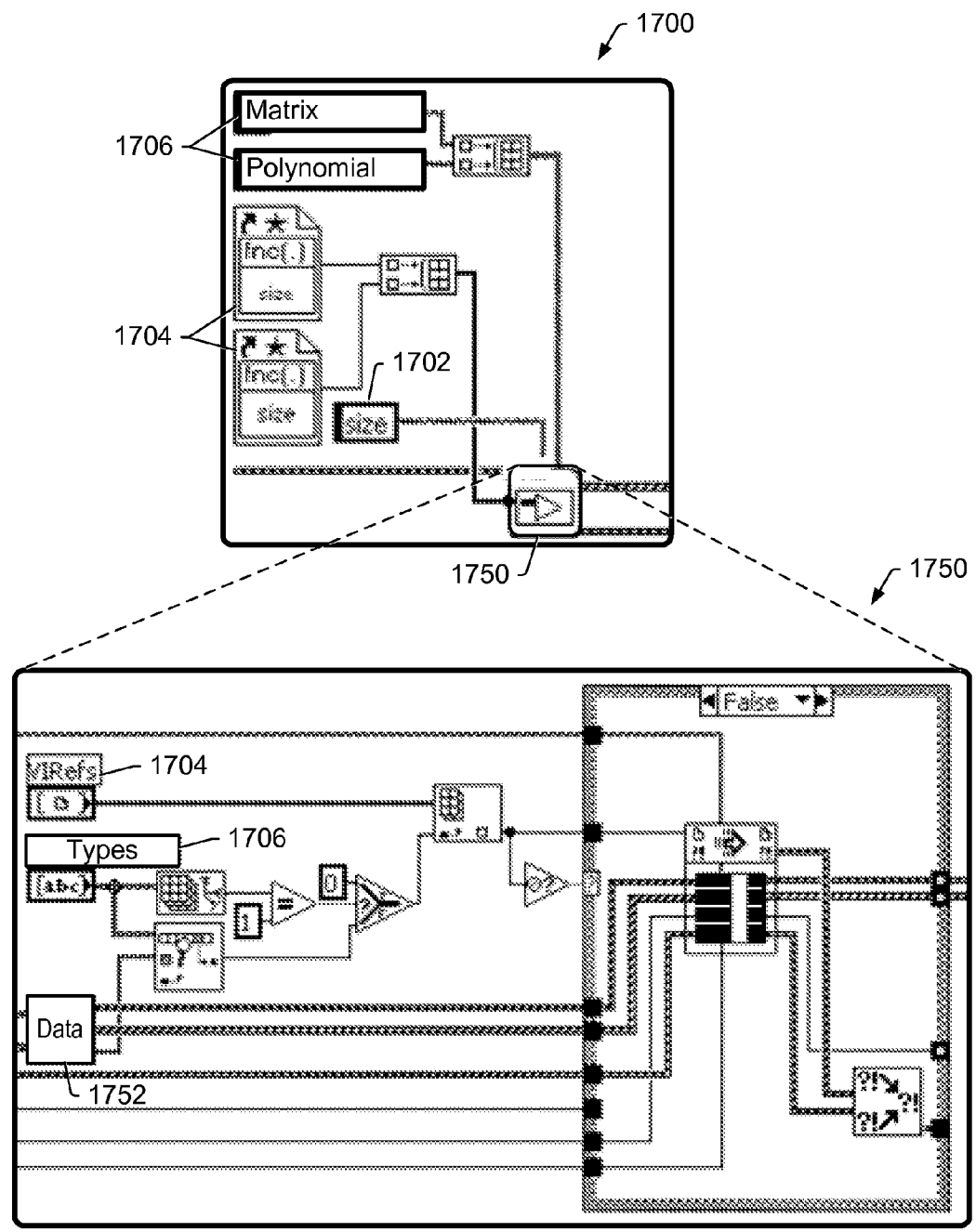
FIGS. 17-19 illustrate respective portions of exemplary graphical program code which may be automatically converted from exemplary textual program instructions.

FIG. 17 illustrates a portion of an exemplary graphical program 1700 which may be automatically converted from the exemplary textual program instructions listed above. More specifically, the textual program instructions, e.g., using the methods described above, may be automatically converted into the exemplary portion of the graphical program 1700 illustrated in FIG. 17, e.g., at compile time. During conversion, strict static VI references for each possible implementation of the function "size" may be automatically created (1704). In this exemplary graphical program 1700, there may be a size VI that accepts matrices and a size VI that accepts polynomials (1704). During conversion, names of the possible types may be created, e.g., in this case, "matrix" and "polynomial" (1706). Note that above listed types are exemplary only and other types are envisioned. The function name 1702, the VI references 1704, and the type names 1706 may be passed to a VI, e.g., MC_FunctionCall.vi 1750, which may select the appropriate function based on the type of the data at runtime. More specifically, during execution, the MC_FunctionCall.vi 1750 may call another VI, e.g., data.vi 1752, which may identify the types, e.g., using the names of the possible types described above. Correspondingly, the MC_FunctionCall.vi 1750 may select the appropriate function of the plurality of functions based on the identified type. Thus, FIG. 17 illustrates a portion of an exemplary graphical program 1700 which may resolve functions (e.g., converted to VIs) using conditional structures constructed before runtime.

The following code illustrates another portion of exemplary textual program instructions that includes declaration of a function handle.

a=@sin % Line 1, declaration of function handle "a"
...% Line 2
...% Line 3
b=...% Line 4
c=a(b) % Line 5

As shown, at line 1, the textual program instructions include a declaration of a function handle that resolves to a function of a plurality of possible functions based on type. More specifically, the function handle refers to a plurality of sin functions, e.g., matrix and polynomial, each of which may be called based on a different type. As shown, various commands may be executed in lines 2 and 3 and b may be declared in line 4. Note that the variable b may include data for various different data types as desired. At line 5, variable c is assigned to the value resulting from calling the function handle a with argument b.

Figure 18:
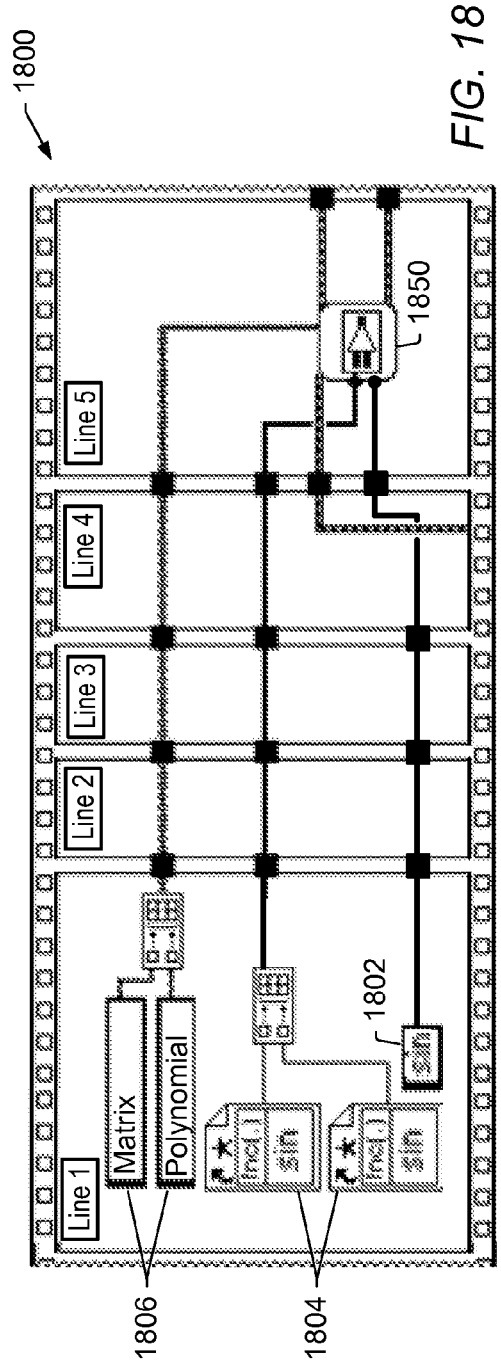

FIG. 18 illustrates a portion of an exemplary graphical program 1800 which may be automatically converted from the exemplary textual program instructions listed above. More specifically, the textual program instructions, e.g., using the methods described above, may be automatically converted into the exemplary portion of the graphical program 1800 illustrated in FIG. 18, e.g., at compile time. During conversion, the function handle may be resolved to the plurality of possible functions; as a result, strict static VI references for each possible implementation of the function "sin" may be automatically created (1804) 1. In this exemplary graphical program 1800, similar to descriptions above, there may be a sin VI that accepts matrices and a sin VI that accepts polynomials (1804). During conversion names of the possible types may be created, e.g., in this case, "matrix" and "polynomial" (1806). The function name 1802, the VI references 1804, and the type names 1806 may be passed to the MC_FunctionCall.vi 1850, which may operate to select the appropriate function based on the type of the data at runtime similar to descriptions above regarding the MC_FunctionCall.vi 1750. More specifically, during execution, the MC_FunctionCall.vi 1850 may call another VI which may identify the types, e.g., using on the names of the possible types described above. Correspondingly, the MC_FunctionCall.vi 1850 may select the appropriate function of the plurality of functions based on the identified type. Thus, FIG. 18 illustrates a portion of an exemplary graphical program 1800 which may resolve functions referred to by a function handle (e.g., converted to VIs) using conditional structures constructed before runtime.

The following code illustrates another portion of exemplary textual program instructions that includes declaration of a function handle.

path(path,str) % Line 1, scope declaration
a=@sin % Line 2, declaration of function handle "a"
...% Line 3
...% Line 4
b=...% Line 5
c=a(b) % Line 6

As shown, at line 1, the textual program instructions include a scope declaration which assigns the path for the location of the functions that are "in scope" at that time. As used herein functions that are "in scope" are functions that are accessible according to the current scope (e.g., based on the most recent scope declaration). In some embodiments, it may not be possible to resolve the path declaration until run time. In these cases, as described above, the VI references may not be populated until runtime. Lines 2-6 follow the exemplary program instructions presented above with regard to FIG. 18.

Figure 19:
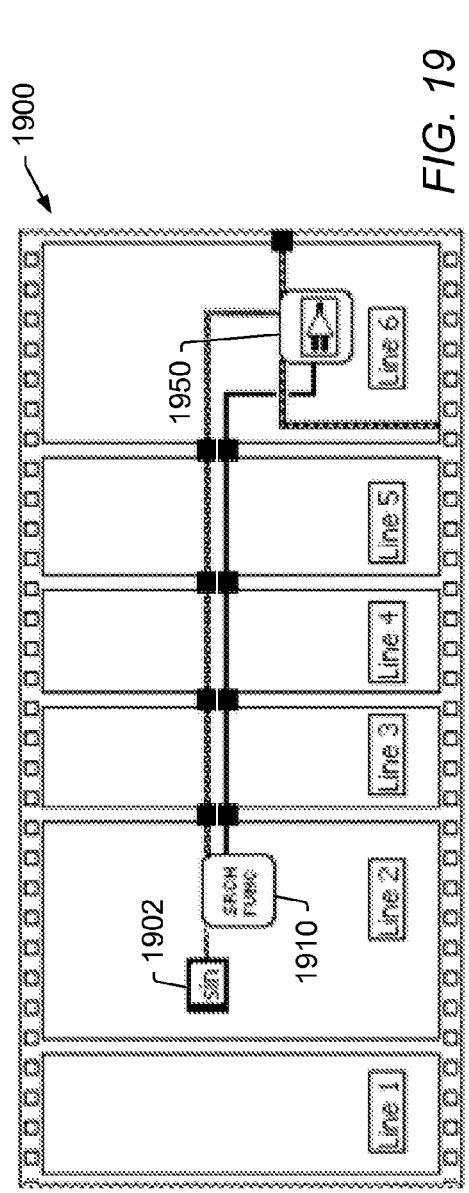

FIG. 19 illustrates a portion of an exemplary graphical program 1900 which may be automatically converted from the exemplary textual program instructions listed above. More specifically, the textual program instructions, e.g., using the methods described above, may be automatically converted into the exemplary portion of the graphical program 1900 illustrated in FIG. 19, e.g., at compile time. As described above, during conversion, code may be generated which may populate the VI references and type names described above. In this case, the srch func node 1910 may perform this population (using the locations indicated by the path declaration of line 1) during execution of the graphical program 1900. Correspondingly, this information may be passed to the MC_FunctionCall.vi 1950 along with the determined function name 1902, in this case, sin, determined from the function handle declaration of line 2. Thus, as described above, during execution, the already constructed srch func node 1910 and the already constructed MC_FunctionCall.vi 1950 (e.g., similar to the MC_FunctionCall.vi 1750 and 1850) may populate the plurality of possible functions and resolve the correct function based on type at runtime. Note that the graphical code generated for FIGS. 18 and 19 may be substantially the same; however, the graphical code generated for FIG. 19 which refers to the VI references may be generated at a different point in time than in FIG. 18. In other words, the explicit definition of the function handle may result in earlier creation of the VI references in FIG. 19. Thus, FIG. 19 illustrates a portion of an exemplary graphical program 1900 which may resolve functions (e.g., converted to VIs) referred to by a function handle and defined by a scope declaration using conditional structures constructed before runtime.

As discussed above, during conversions, each of the graphical programs may be typed according to the textual program instructions. The variables may be strictly typed or generically typed as desired. Thus, the above textual program instructions and resulting portions of graphical programs illustrated in FIGS. 17-19 illustrate exemplary conversions according to the methods described above.

Benefits of the Method

U.S. Pat. No. 6,857,118, which is hereby incorporated by reference as though fully and completely set forth herein, generally relates to function handles which are declared in an interpreted, dynamically-typed scripting language with function overloading (e.g., MATLAB™). In the '118 patent, during execution of a script, at a first point, a function handle is declared which refers to a plurality of functions that are in scope at that point. At a later point during execution of the script, the function handle is called with an argument. At the later point, a function out of the plurality of functions is chosen using the function handle.

The instant Application, in contrast, relates to a method for converting textual based program instructions to a separate graphical program, compiling that graphical program into execution instructions, and then executing the execution instructions. In particular, the instant Application describes a method which, instead of executing the textual program instructions, converts the textual program instructions into a graphical program, e.g., a graphical program in a fixed type graphical programming language such as LabVIEW®. Thus, in some embodiments, the textual program instructions may declare a function handle. However, the newly generated graphical program does not include the function handle declaration or a function handle. Instead, in converting the textual program instructions, a conditional structure may be constructed at compile time, and the conditional structure may be later used at runtime to resolve a function from the plurality of possible functions based on type.

The instant Application also provides many benefits over Prior Art methods for interpreting textual program instructions. For example, the conversion of the textual code to a compiled graphical program in a fixed type programming language may provide execution performance benefits over the interpreted textual code. Also, the conversion allows the execution of the textual code in the graphical programming language, wherein a graphical program representation may provide a much better visual representation of the operation of the program. In addition, once the textual program has been converted into a graphical program, various graphical program debugging features may be available, such as block execution highlighting that illustrates data flow in the program, which are not available in a text based language. Further, the graphical program may inherently support parallelism in execution, which is generally unavailable in a sequential text based program such as MATLAB®.

Although the system and method of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for creating a graphical program, the method comprising:

utilizing a computer to perform:

receiving user input specifying textual program code in a numerical analysis programming language; and automatically creating a graphical program in a graphical programming language in response to receiving the textual program code, wherein the graphical program comprises a plurality of interconnected nodes, wherein the plurality of interconnected nodes visually indicates functionality of the graphical program, wherein said automatically creating the graphical program comprises generating graphical code, including translating functions in the textual program code along with their associated parameters into corresponding graphical code versions and data types in the graphical programming language, thereby generating the plurality of interconnected nodes;

wherein the graphical program in the graphical programming language is compilable to produce executable code, wherein said automatically creating comprises creating the graphical program without user input specifying the nodes or connections between the nodes, wherein the functionality of the graphical program corresponds to the functionality specified in the textual program code.

2. The method of claim 1, wherein the graphical program is a graphical data flow program, wherein connections between nodes indicate that data produced by one node is used by another node.

3. The method of claim 1, further comprising:

displaying the graphical program on a display.

4. The method of claim 1, wherein said automatically creating the graphical program comprises:

automatically generating a graphical program generation program which is executable to create the graphical program; and executing the graphical program generation program to create the graphical program.

5. The method of claim 4, wherein the graphical program generation program is created in an XML format.

6. The method of claim 1, wherein automatically creating further comprises:

automatically generating a syntax tree in response to receiving the textual program code; and automatically creating the graphical program based on the syntax tree.

7. The method of claim 6, wherein the syntax tree is automatically generated as a native data structure of the graphical program.

8. The method of claim 6, wherein the syntax tree comprises nodes useable to create the graphical program;

wherein said automatically creating the graphical program further comprises:

searching for unprocessed nodes in the syntax tree that do not have any child nodes;

searching for unprocessed nodes in the syntax tree whose child nodes are all processed; and determining if any nodes in the syntax tree are found to be unprocessed.

9. The method of claim 8, further comprising:

if no nodes in the syntax tree are found to be unprocessed, executing a post-processing routine, wherein the post-processing routine comprises creating a graphical program generation program.

10. The method of claim 8, further comprising:

if any nodes in the syntax tree are found to be unprocessed, selecting a node for processing;

determining a node-type for the selected node;

executing a code generation routine specific to the node-type for the selected node; and marking the selected node as processed.

11. The method of claim 10, wherein said executing the code generation routine further comprises:

automatically generating graphical code associated with the selected node.

12. The method of claim 10, wherein said executing the code generation routine further comprises:

automatically generating graphical program generation code that defines steps for building graphical code corresponding to a node in the syntax tree;

accumulating the graphical program generation code for a plurality of processed nodes in the syntax tree; and storing the graphical program generation code.

13. The method of claim 1, wherein the numerical analysis programming language is loosely typed.

14. The method of claim 1, wherein the textual program code in numerical analysis programming language comprises at least a portion of an m-file.

15. A method for assembling a graphical block diagram from a syntax tree comprising:

receiving a syntax tree corresponding to functionality in a portion of executable code generated from a textual program in a numerical analysis programming language; and automatically generating program instructions for generating a graphical program in a graphical programming language in response to the syntax tree, wherein the program instructions specify creation of the graphical program;

executing the program instructions to generate the graphical program, wherein the graphical program includes executable graphical program code, wherein the graphical program has functionality corresponding to that described by the syntax tree;

wherein the graphical program comprises a plurality of interconnected nodes, wherein the plurality of interconnected nodes visually indicates the functionality of the graphical program, wherein said generating the graphical program comprises generating graphical code, including translating elements in the syntax tree along with their associated parameters into corresponding graphical code versions and data types in the graphical programming language, thereby generating the plurality of interconnected nodes.

16. The method of claim 15:

wherein the program instructions are represented in an XML format.

17. The method of claim 15, wherein the numerical analysis programming language is loosely typed.

18. The method of claim 15, wherein the textual program code in numerical analysis programming language comprises at least a portion of an m-file.

19. A non-transitory memory medium comprising program instructions for creating a graphical program, wherein the program instructions are executable to:

receive user input specifying textual program code in a numerical analysis programming language, wherein the textual program code performs a first procedure; and automatically create a graphical program in a graphical programming language in response to the textual program code, wherein the graphical program comprises a plurality of interconnected nodes that visually indicates functionality of the graphical program wherein said automatically creating the graphical program comprises generating graphical code, including translating functions in the textual program code along with their associated parameters into corresponding graphical code versions and data types in the graphical programming language, thereby generating the plurality of interconnected nodes;

wherein the graphical program in the graphical programming language is compilable to produce executable code;

wherein said automatically creating comprises creating the graphical program without user input specifying the nodes or connections between the nodes; and wherein the graphical program performs the first procedure.

20. The non-transitory memory medium of claim 19, wherein the graphical program is a graphical data flow program, wherein connections between nodes indicate that data produced by one node is used by another node.

21. The non-transitory memory medium of claim 19, further comprising program instructions executable to:

display the graphical program on a display.

22. The non-transitory memory medium of claim 19, wherein, in said automatically creating the graphical program, the program instructions are executable to:

automatically generate a graphical program generation program which is executable to create the graphical program; and execute the graphical program generation program to create the graphical program.

23. The non-transitory memory medium of claim 22, wherein the graphical program generation program is created in an XML format.

24. The non-transitory memory medium of claim 19, wherein program instructions executable to automatically create a graphical program further comprise program instructions executable to:

automatically generate a syntax tree in response to the textual program code; and automatically assemble the graphical program based on the syntax tree.

25. The non-transitory memory medium of claim 24, wherein the syntax tree comprises nodes useable to create the graphical program;

wherein program instructions executable to automatically assemble the graphical program further comprise program instructions executable to:

search for unprocessed nodes in the syntax tree that do not have any child nodes;

search for unprocessed nodes in the syntax tree whose child nodes are all processed; and determine if any nodes in the syntax tree are found to be unprocessed.

26. The non-transitory memory medium of claim 25, further comprising program instructions executable to:

if no nodes in the syntax tree are found to be unprocessed, execute a post-processing routine, wherein the post-processing routine comprises creating a graphical program generation program.

27. The non-transitory memory medium of claim 25, further comprising program instructions executable to:

if any nodes in the syntax tree are found to be unprocessed, select a node for processing;

determine a node-type for the selected node;

execute a code generation routine specific to the node-type for the selected node; and mark the selected node as processed.

28. The non-transitory memory medium of claim 27, wherein program instructions executable to execute a code generation routine further comprise program instructions executable to:

automatically generate graphical program code associated with the selected node, wherein a graphical block diagram is automatically assembled.

29. The non-transitory memory medium of claim 19, wherein the numerical analysis programming language is loosely typed.

30. The non-transitory memory medium of claim 19, wherein the textual program code in numerical analysis programming language comprises at least a portion of an m-file.

31. A computer system comprising:

a memory;

a processor; and computer-readable code stored on said memory and processable by said processor for creating a graphical program in a graphical programming language, said computer-readable code including instructions for causing said processor to:

receive user input specifying textual program code in a numerical analysis programming language; and automatically create a graphical program in the graphical programming language in response to receiving the textual program code, wherein the graphical program comprises a plurality of interconnected nodes that visually indicates functionality of the graphical program, wherein said automatically creating the graphical program comprises generating graphical code, including translating functions in the textual program code along with their associated parameters into corresponding graphical code versions and data types in the graphical programming language, thereby generating the plurality of interconnected nodes;

wherein said automatically creating comprises creating the graphical program without user input specifying the nodes or connections between the nodes, wherein the functionality of the graphical program corresponds to functionality specified in the textual program code.

32. The computer system of claim 31, wherein the numerical analysis programming language is loosely typed.

33. The computer system of claim 31, wherein the textual program code in numerical analysis programming language comprises at least a portion of an m-file.

* * * * *